(12) United States Patent
Tanudra et al.

(10) Patent No.: US 11,358,539 B2
(45) Date of Patent: Jun. 14, 2022

(54) TRANSPORTATION CONTAINER

(71) Applicant: TMS International Corporation, Pittsburgh, PA (US)

(72) Inventors: Miguel Tanudra, Willow Grove, PA (US); Fernando Rodriguez Anton, Philadelphia, PA (US); Mark Whalen, Sewickley, PA (US)

(73) Assignee: TMS International Corporation, Pittsburgh, PA (US)

( * ) Notice: Subject to any disclaimer, the term of this patent is extended or adjusted under 35 U.S.C. 154(b) by 0 days.

(21) Appl. No.: 16/852,608

(22) Filed: Apr. 20, 2020

(65) Prior Publication Data

US 2020/0331377 A1 Oct. 22, 2020

Related U.S. Application Data

(60) Provisional application No. 62/836,777, filed on Apr. 22, 2019.

(51) Int. Cl.
| | | |
|---|---|---|
| *B60R 13/01* | (2006.01) | |
| *B60P 1/26* | (2006.01) | |
| *B62D 33/027* | (2006.01) | |
| *B65G 67/24* | (2006.01) | |
| *B60P 1/64* | (2006.01) | |

(52) U.S. Cl.
CPC ............ *B60R 13/01* (2013.01); *B60P 1/26* (2013.01); *B62D 33/0273* (2013.01); *B60P 1/6409* (2013.01); *B60P 1/6427* (2013.01); *B65G 67/24* (2013.01)

(58) Field of Classification Search
CPC ......... B60P 1/267; B60R 13/01; B65D 88/12; B65D 88/122; B65D 88/123; B65D 90/041
USPC ......................................... 296/39.2
See application file for complete search history.

(56) References Cited

U.S. PATENT DOCUMENTS

| | | | | |
|---|---|---|---|---|
| 4,181,349 A | * | 1/1980 | Nix ......................... | B60R 13/01 296/39.2 |
| 4,529,349 A | * | 7/1985 | Lutz ...................... | B60P 1/6454 414/421 |
| 4,575,146 A | * | 3/1986 | Markos ................... | B60R 13/01 296/39.2 |

(Continued)

FOREIGN PATENT DOCUMENTS

| | | |
|---|---|---|
| JP | 2007269272 A | 10/2007 |
| KR | 200247750 Y1 | 10/2001 |

(Continued)

*Primary Examiner* — James Keenan
(74) *Attorney, Agent, or Firm* — The Webb Law Firm

(57) ABSTRACT

A container for transporting material including a main body and a liner disposed within the interior space of the main body. A gap is provided between a perimeter of the main body and a perimeter of the liner to allow the liner to move with respect to the main body. Also, a container for transporting material including a main body defining an interior space with a lift gate pivotably attached at an open end of the main body. When the container is placed on a transportation vehicle and the main body is raised, the engagement of a link between the lift gate and the vehicle automatically transitions the lift gate from a position in which the open end of the main body is covered by the lift gate to a position in which the open end of the main body is not covered by the lift gate.

14 Claims, 23 Drawing Sheets

(56) References Cited

U.S. PATENT DOCUMENTS

| | | | |
|---|---|---|---|
| 5,249,843 A | | 10/1993 | Hagenbuch et al. |
| 5,288,137 A | | 2/1994 | Henry |
| 6,015,191 A | * | 1/2000 | Bontrager ............... B60P 1/267 |
| | | | 298/23 D |
| 6,619,717 B2 | * | 9/2003 | Gardiner ................. B60P 1/286 |
| | | | 296/39.2 |
| 10,029,597 B2 | * | 7/2018 | Reynolds ........... B65D 90/0066 |

FOREIGN PATENT DOCUMENTS

| | | |
|---|---|---|
| KR | 200348547 Y1 | 4/2004 |
| KR | 101853320 B1 | 4/2018 |
| KR | 200486557 Y1 | 6/2018 |

\* cited by examiner

TRANSPORTATION CONTAINER

CROSS REFERENCE TO RELATED APPLICATIONS

The present application claims priority to U.S. Provisional Patent Application No. 62/836,777, filed Apr. 22, 2019, the disclosure of which is hereby incorporated in its entirety by reference.

BACKGROUND OF THE INVENTION

Field of the Invention

The present invention relates to a container for holding and hauling hot metal melting by-products, such as slag, and, more particularly, to a container capable of withstanding high temperatures that allows for automatic lift-gate opening for safety of the operator.

Description of Related Art

During the processing of raw materials for melting operations, particularly steel making operations, the by-product left over after separation of metals, typically referred to as slag, must be removed and transported to an appropriate disposal or recycling site.

Slag is produced during the separation of molten steel from impurities. It is generally composed of a mixture of metal oxides, silicon dioxide, and occasionally sulfides and elemental metals. It occurs as a molten liquid melt, and solidifies once it has cooled so the slag is often transported in a hot, molten state for disposal.

Slag may be placed in a standard roll-off box or other container for disposal or recycling. These boxes are placed on a truck with an appropriate receptacle to accept the box and transport it to the drop off site.

Standard roll-off boxes are not designed to hold hot slag and can fail prematurely due to the high temperature of the slag, which can initially range from 1200-1500° F. Additionally, failure can occur from the impact of falling hot slag when being loaded, or as the hot slag is held within the box. Failure is identified when floor or wall panels of the box fail, as repeated impact from loading and unloading wears the panels to their limits. This causes cracks, holes, and gaps through which molten material can escape. Further, the high temperatures of the slag reduces the metal's rigidity and ability to withstand impact. Thermal stresses caused by cyclical temperature fluctuations also contribute to box failure by impacting the weld seams and other rigid connections within the box, or by causing the floor and/or wall panels to warp and deform. The cyclical temperature fluctuations also cause the floor and/or wall panels of the box to expand and contract, thus putting further stress on seams and other rigid connections. The failure of standard roll-off boxes can expose operators to an outflow of molten slag and other dangerous conditions.

Standard roll-off boxes also have manually operated hinged gates. This requires that the operator manually open the gate on the roll-off box during unloading, exposing them to hazardous conditions and unnecessary danger.

Slag is typically disposed of in one of several ways. Molten slag can be tapped directly into a slag pot from a furnace. This slag pot is then used to transport molten slag to a designated area where the slag can be disposed of in a safe manner. Alternatively, slag can be poured directly from the furnace onto the floor or another area underneath the furnace, where the slag is left to cool and solidify. A machine then removes the slag and transports the slag to a safe dumping area or transfers it into a dump truck which can then transport the hardened slag material to another area to be processed. These methods require specialized equipment, such as a slag pot, which may not be readily available or may be cost prohibitive and do not provide a safe and easily transportable method for slag removal.

These problems create a need for a container which can handle the high temperatures and heavy impact of molten slag during loading and transportation, and which allows for automatic opening and closing of the lift gate during unloading.

SUMMARY OF THE INVENTION

The present invention is directed to a container for transporting material comprising a main body having a perimeter defining an interior space, and a liner disposed within the interior space of the main body, the liner having a perimeter with a shape corresponding to a shape of the perimeter of the main body and defining an interior space, wherein a gap is provided between the perimeter of the main body and the perimeter of the liner.

The main body may be comprised of a plurality of frame members that define a plurality of open spaces, and the liner may be movably connected to the main body. The liner may be movably connected to the main body through at least one connector attached to the main body or the liner that extends through at least one elongated slot in the other of the main body or the liner.

The container may further comprise a lift gate pivotably attached to the main body.

The present invention is also directed to a container for transporting material comprising a main body comprising a perimeter comprising two sides, a closed end, and an open end and defining an interior space, a lift gate pivotably attached at the closed end of the main body, and a link having a first end connected to the lift gate and a second end adapted to be connected to a vehicle used to transport the container. When the container is placed on the vehicle and the closed end of the main body is raised with respect to the open end of the main body, the engagement of the link with the lift gate and the vehicle automatically transitions the lift gate from a first position in which the open end of the main body is covered by the lift gate to contain material within the interior space to a second position in which the open end of the main body is not covered by the lift gate to allow material to be emptied from the interior space.

The link may be a flexible cable and the cable may be threaded through a plurality of pulleys between the first end and the second end to facilitate transitioning of the lift.

The main body may have a perimeter defining an interior space and the container may further comprise a liner disposed within the interior space defined by the perimeter of the main body. The liner may have a perimeter with a shape corresponding to a shape of the perimeter of the main body and defining an interior space. The liner may be movable with respect to the main body through a movable connection between the liner and the main body.

The main body may be comprised of a plurality of frame members that define a plurality of open spaces.

The present invention is additionally directed to an assembly for transporting material comprising a vehicle including an engagement member, a container adapted to be carried by the vehicle, the container comprising a main body comprising a perimeter comprising two sides, a closed end, and an open end and defining an interior space, a lift gate pivotably attached at the closed end of the main body of the container, and a link having a first end connected to the lift gate and a second end connected to the engagement member. When the container is placed on the vehicle and the closed end of the main body is raised with respect to the open end of the main body, the engagement of the link with the lift gate and the vehicle automatically transitions the lift gate from a first position in which the open end of the main body is covered by the lift gate to contain material within the interior space of the container to a second position in which the open end of the main body is not covered by the lift gate to allow material to be emptied from the interior space of the container.

The link may be a flexible cable and the cable may be threaded through a plurality of pulleys between the first end and the second end to facilitate transitioning of the lift.

The main body may have a perimeter defining an interior space and the container may further comprise a liner disposed within the interior space defined by the perimeter of the main body. The liner may have a perimeter with a shape corresponding to a shape of the perimeter of the main body and defining an interior space. The liner may be movable with respect to the main body through a movable connection between the liner and the main body.

The main body may be comprised of a plurality of frame members that define a plurality of open spaces.

DESCRIPTION OF THE INVENTION

Figure 1:
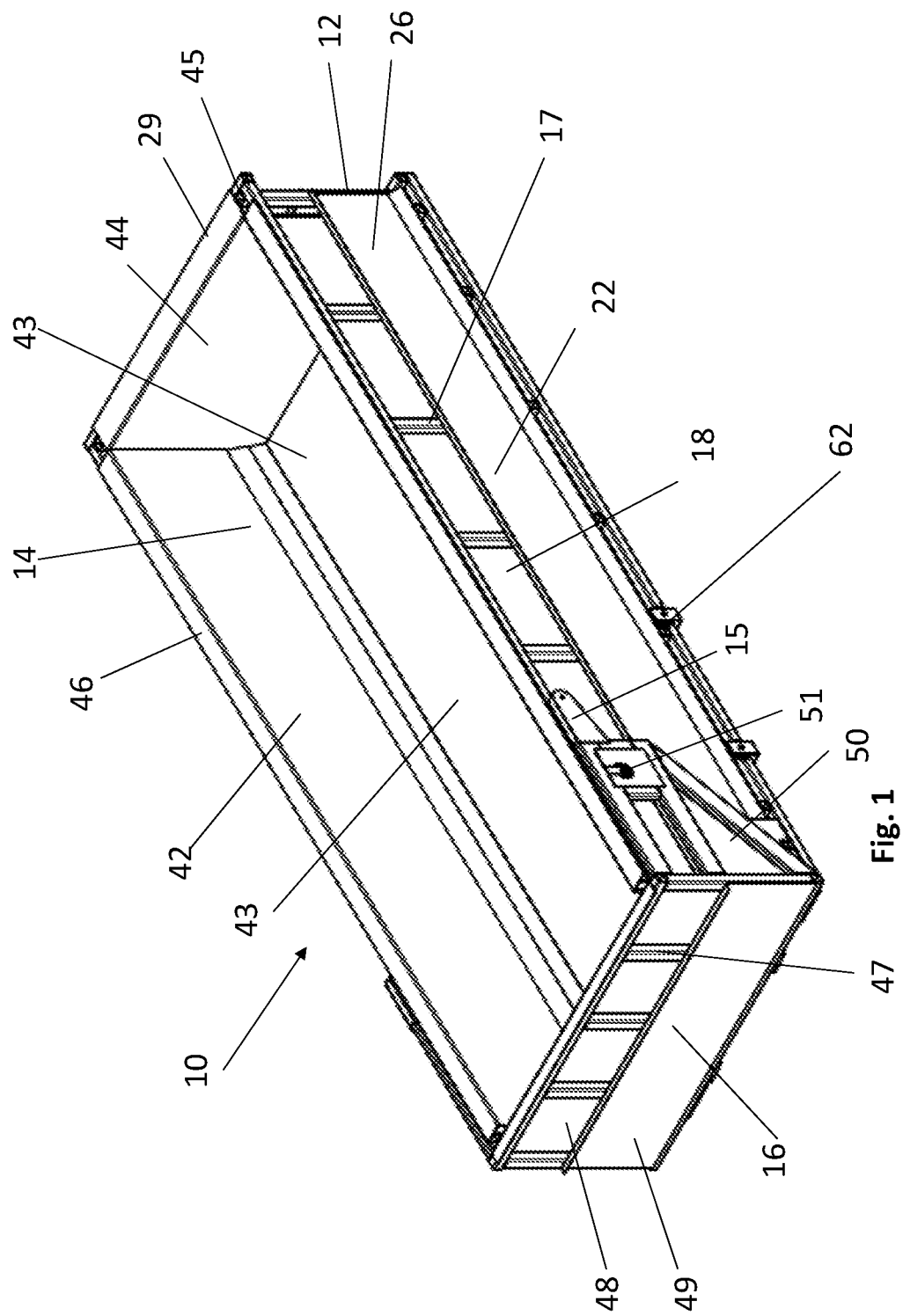
FIG. 1 is a perspective view from the rear of a container assembly comprising a main body, a lift gate in a closed position, and a liner according to the invention.
Figure 2A:
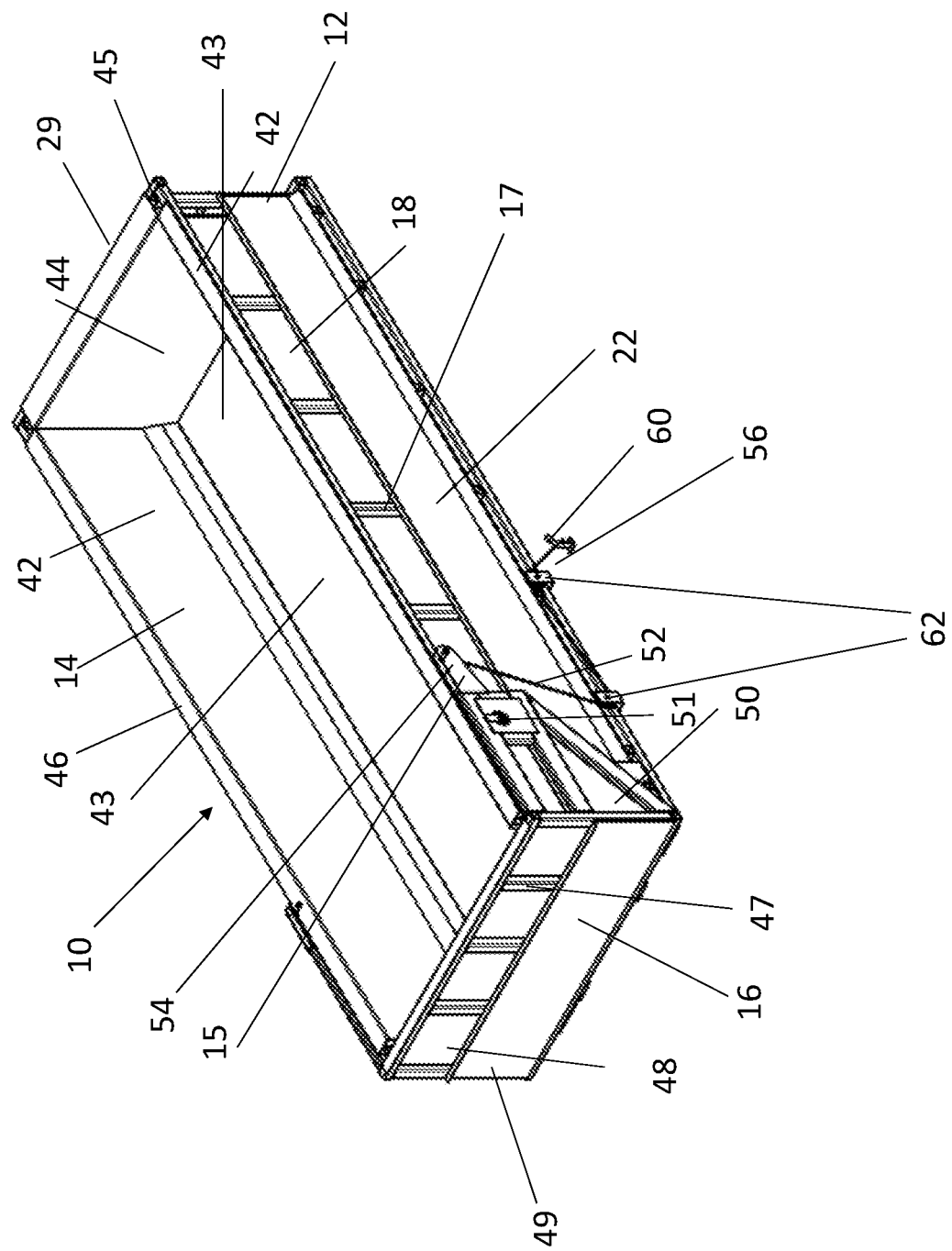
FIG. 2A is a perspective view from the rear of a container assembly comprising a main body, a lift gate in a closed position, a liner, and a link configured in a pulley arrangement according to the invention.
Figure 2B:
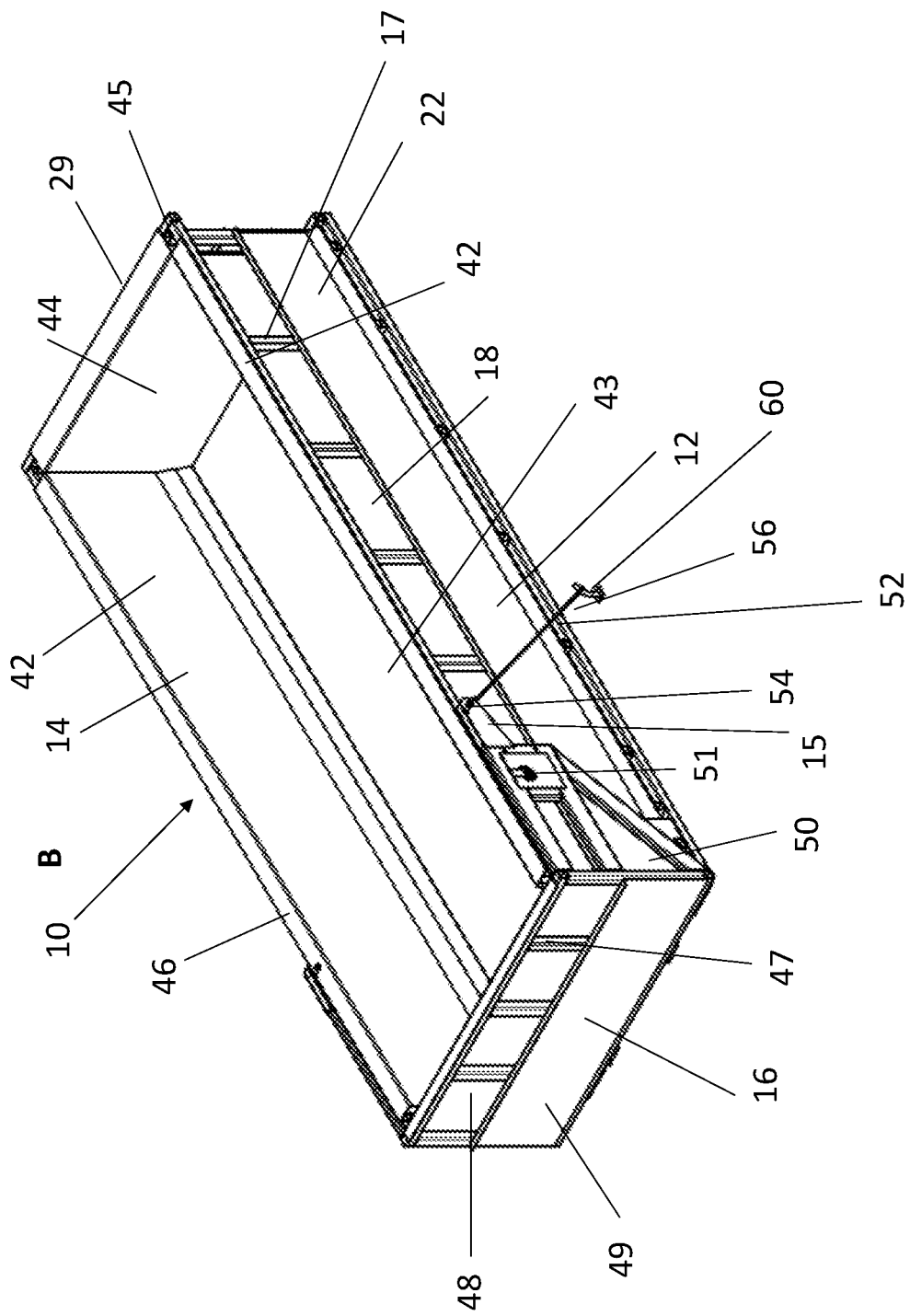
FIG. 2B is a perspective view from the rear of a container assembly comprising a main body, a lift gate in a closed position, a liner, and a link according to the invention.
Figure 3:
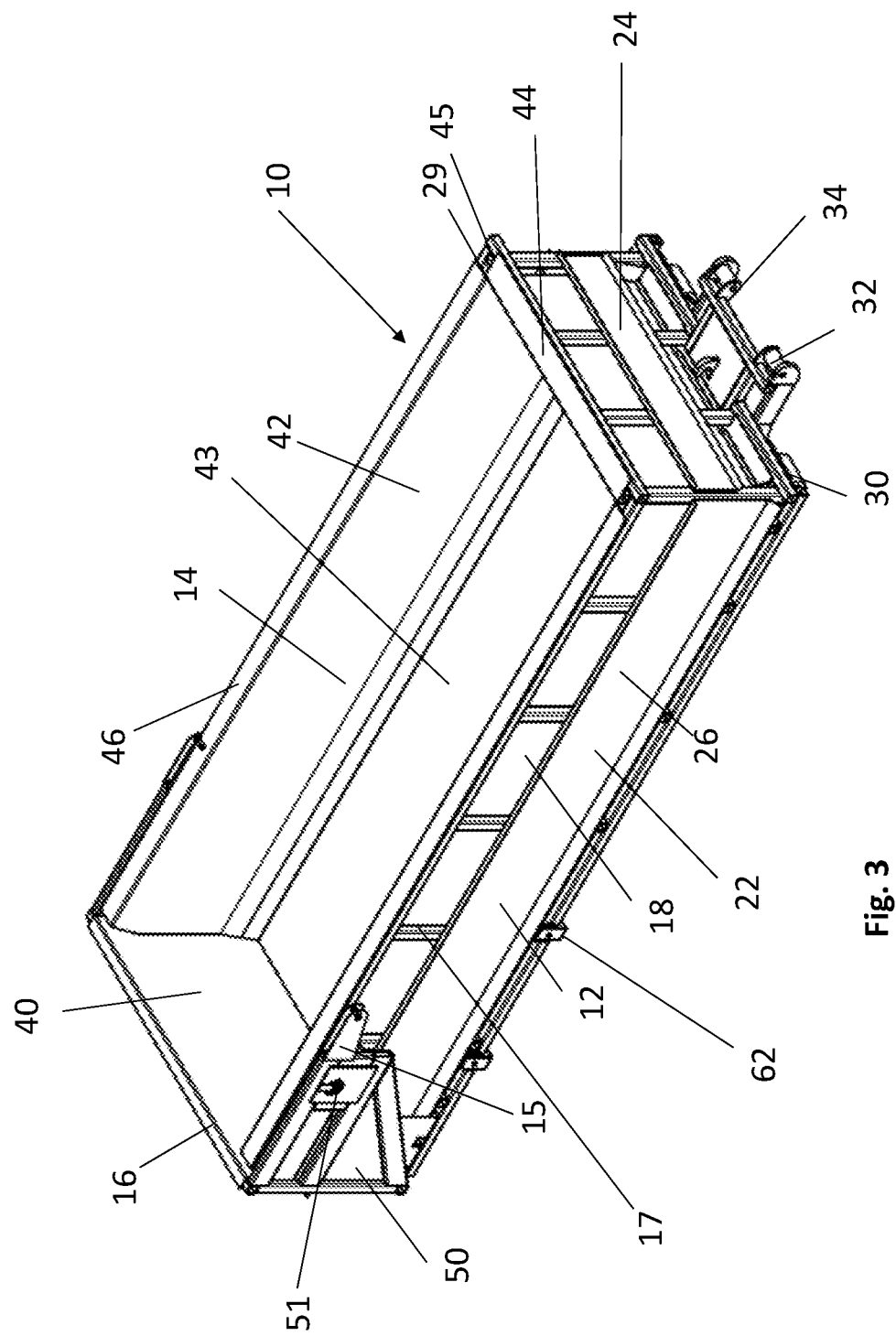
FIG. 3 is a perspective view from the front of a container assembly comprising a main body, a lift gate in a closed position, and a liner according to the invention.
Figure 4A:
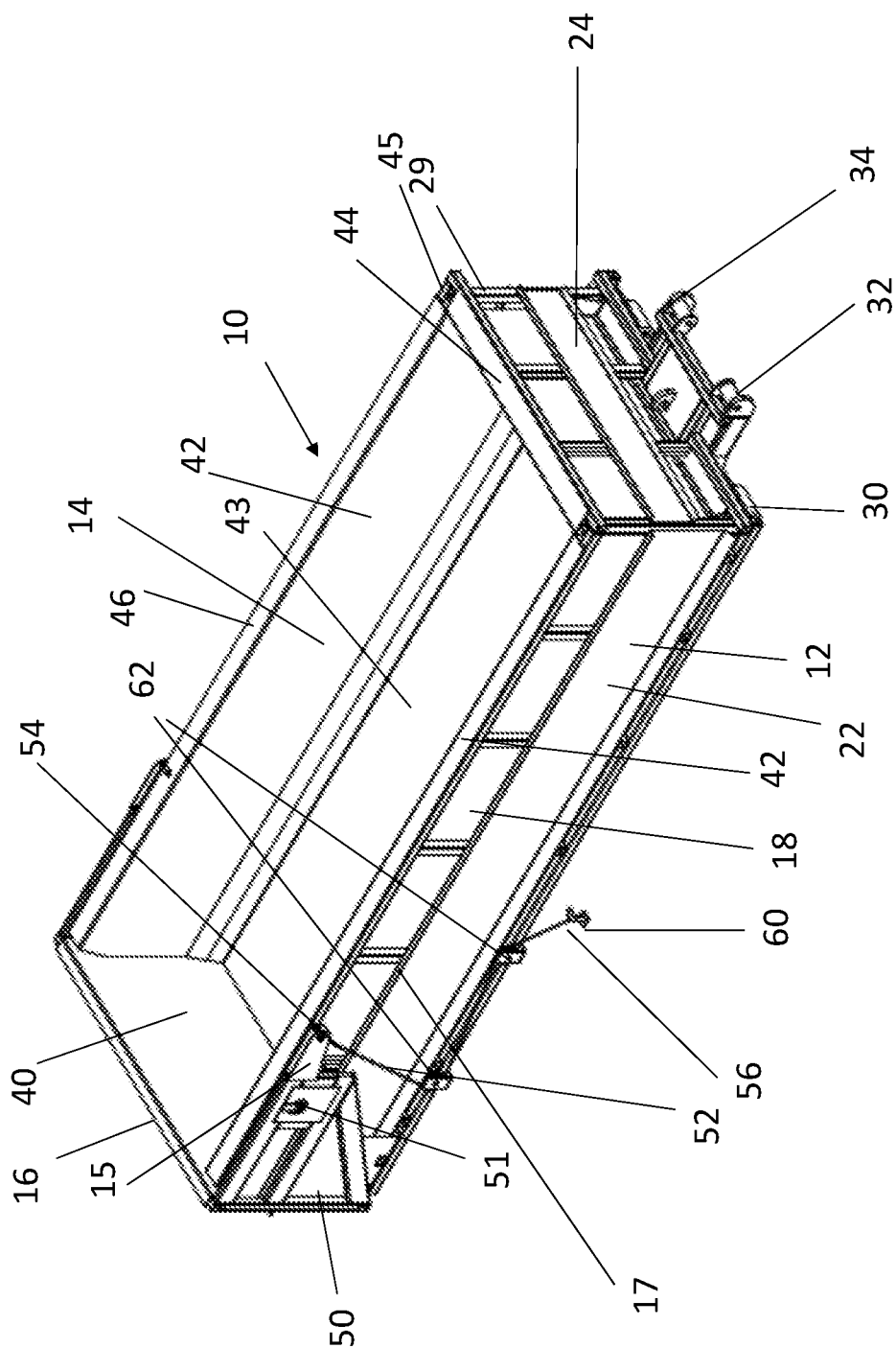
FIG. 4A is a perspective view from the front of a container assembly comprising a main body, a lift gate in a closed position, a liner, and a link configured in a pulley arrangement according to the invention.
Figure 4B:
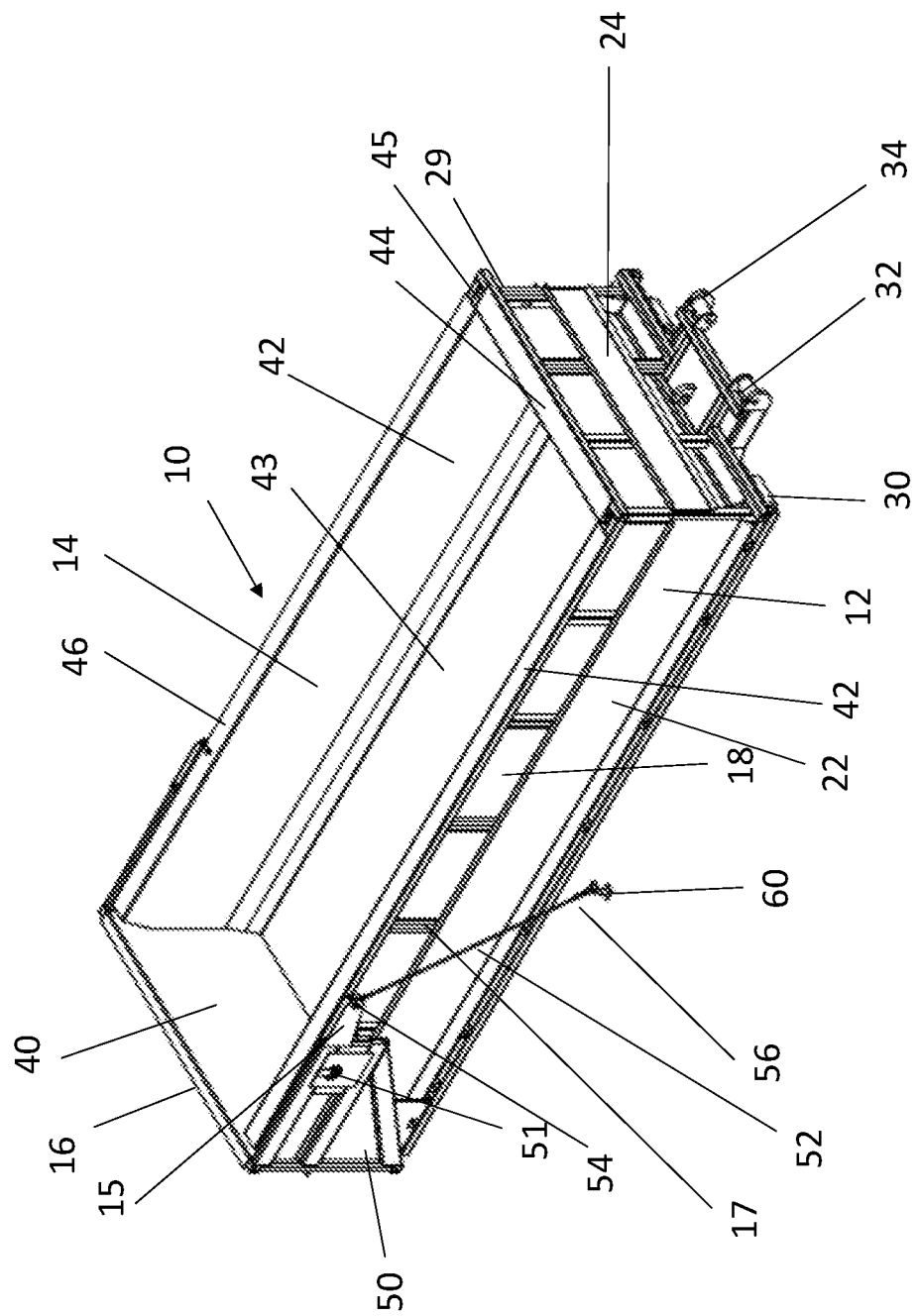
FIG. 4B is a perspective view from the front of a container assembly comprising a main body, a lift gate in a closed position, a liner, and a link according to the invention.
Figure 5:
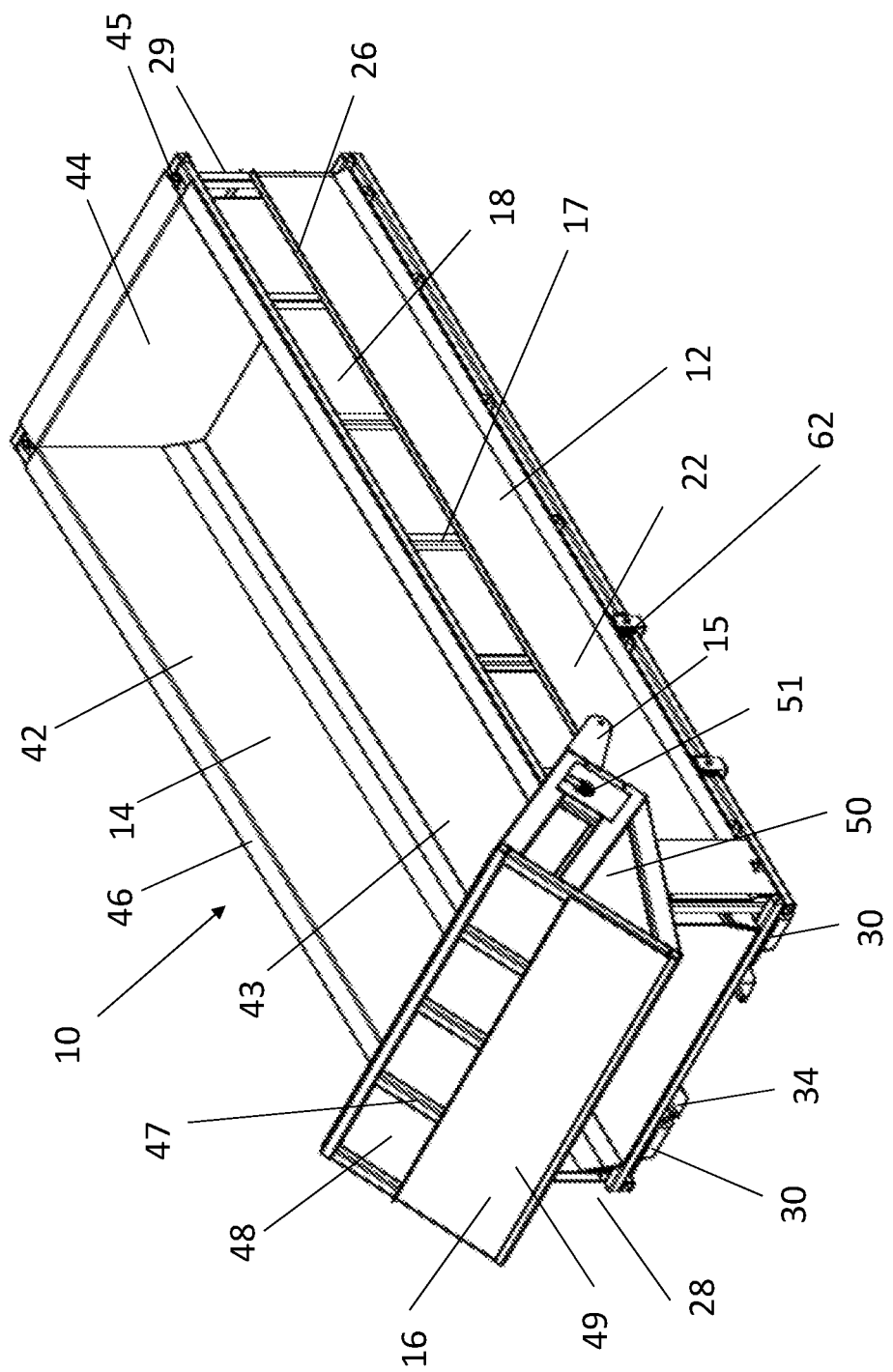
FIG. 5 is a perspective view from the rear of a container assembly comprising a main body, a lift gate in an open position, and a liner according to the invention.
Figure 6:
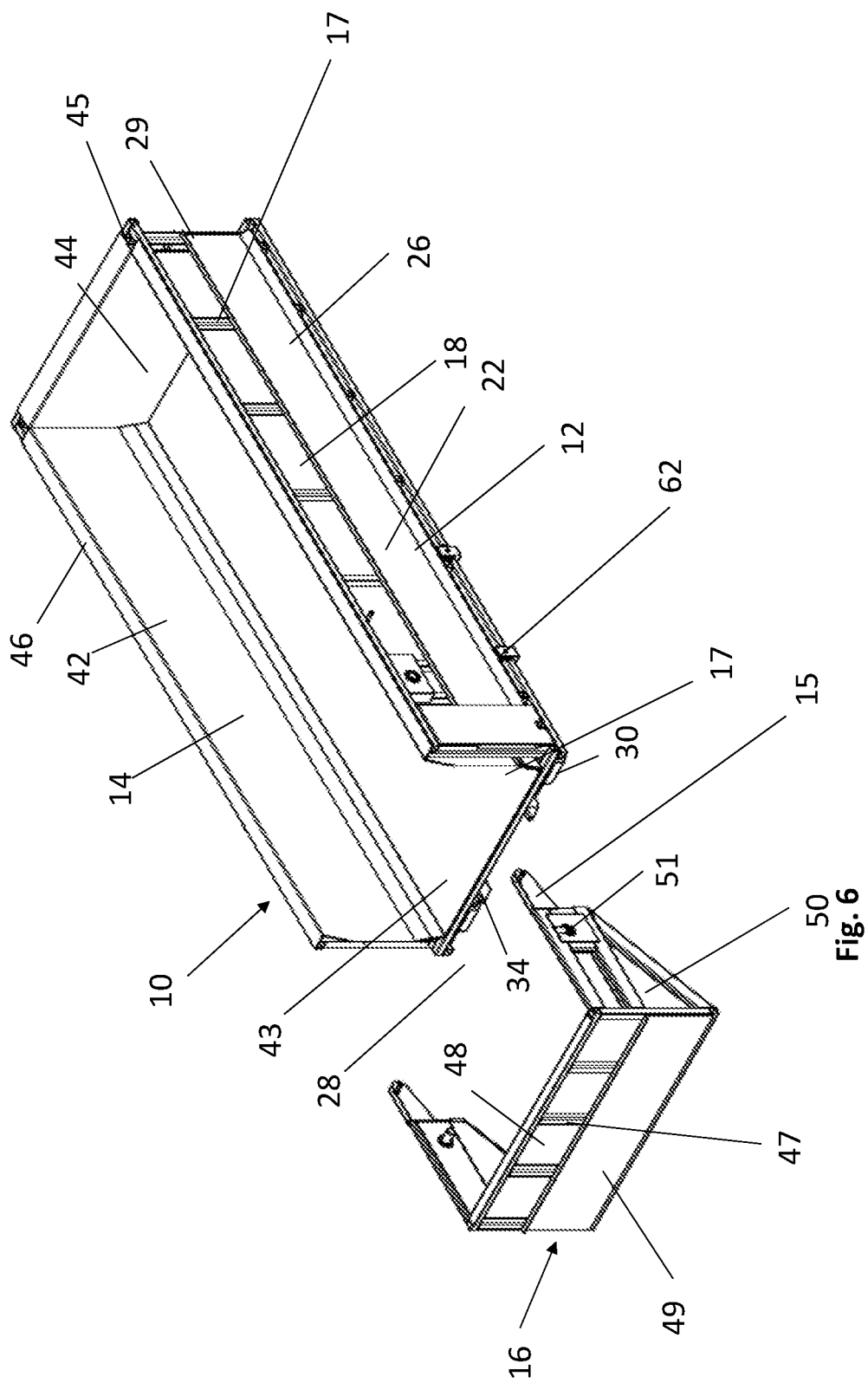
FIG. 6 is a partially expanded perspective view from the rear of a container assembly comprising a main body, a lift gate, and a liner according to the invention.
Figure 7:
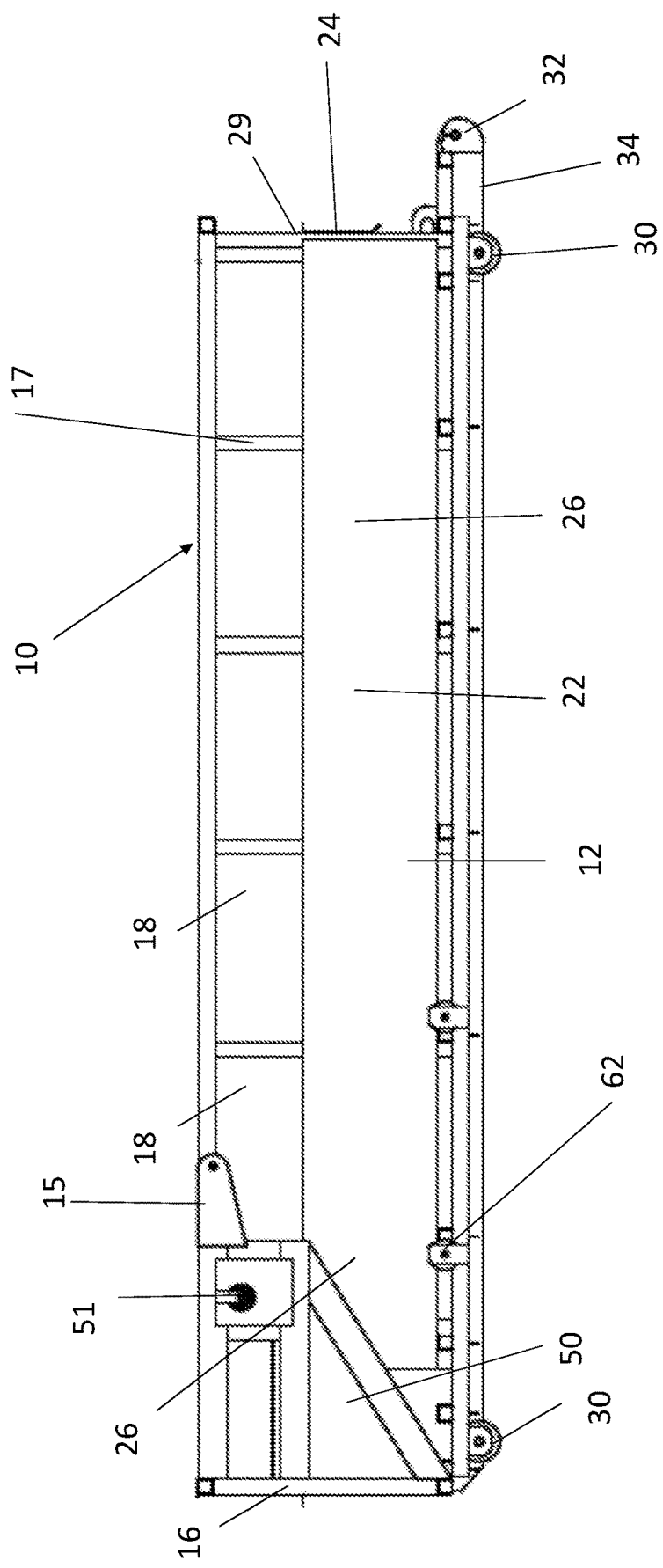
FIG. 7 is a side view of a container assembly comprising a main body, a lift gate in a closed position, and a liner according to the invention.
Figure 8:
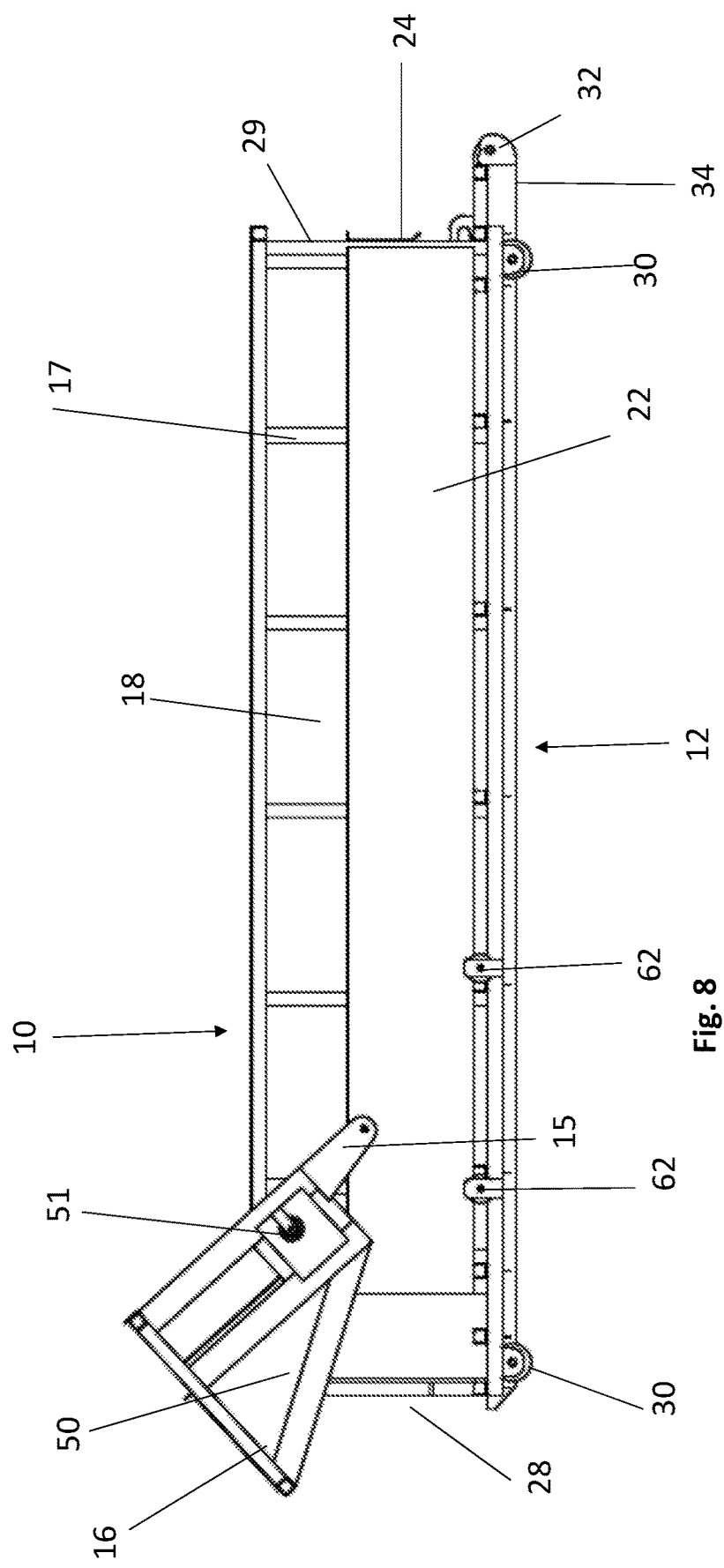
FIG. 8 is a side view of a container assembly comprising a main body, a lift gate in an open position, and a liner according to the invention.
Figure 9:
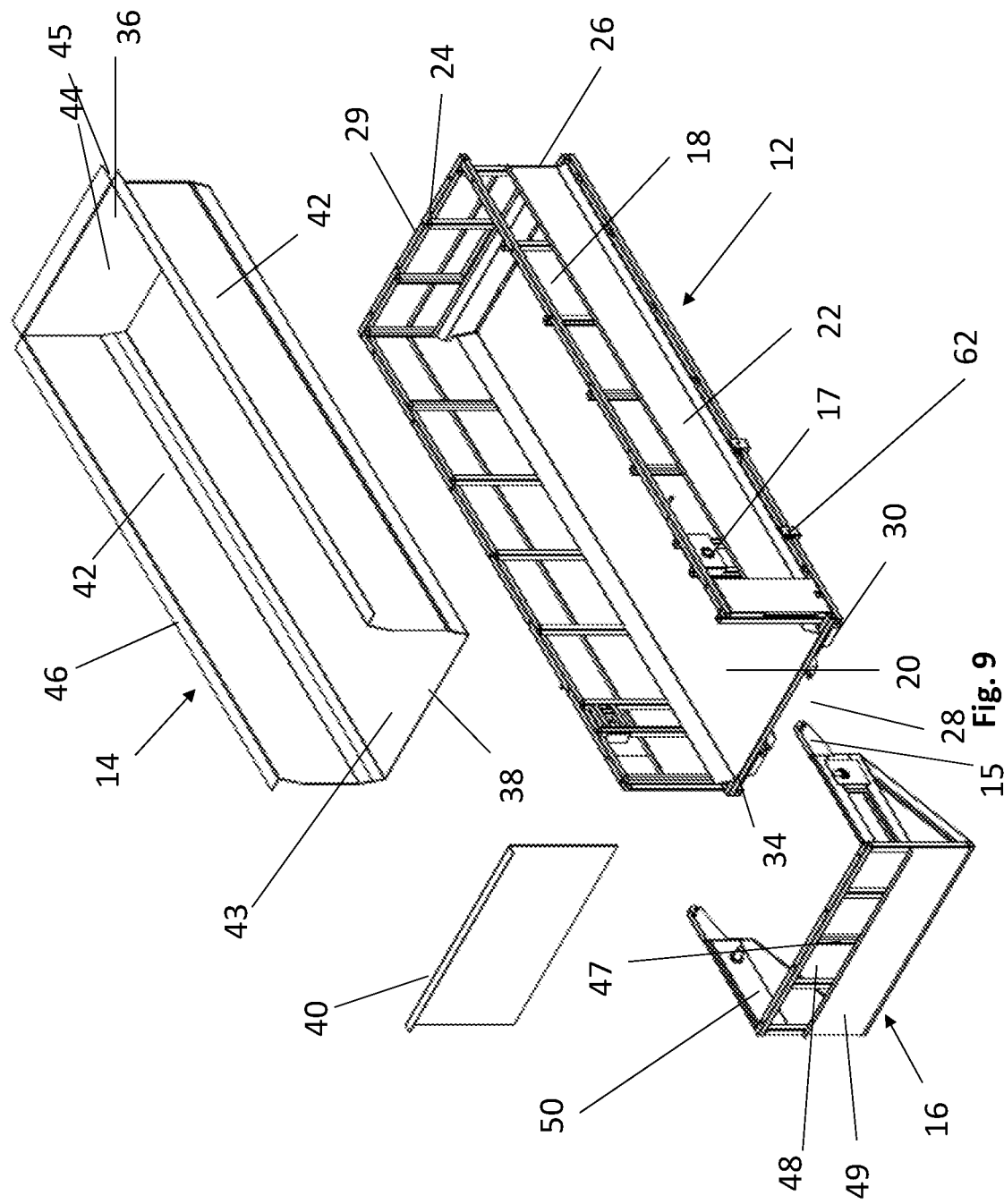
FIG. 9 is an exploded perspective view from the rear of a container assembly comprising a main body, a lift gate, and a liner according to the invention.
Figure 10:
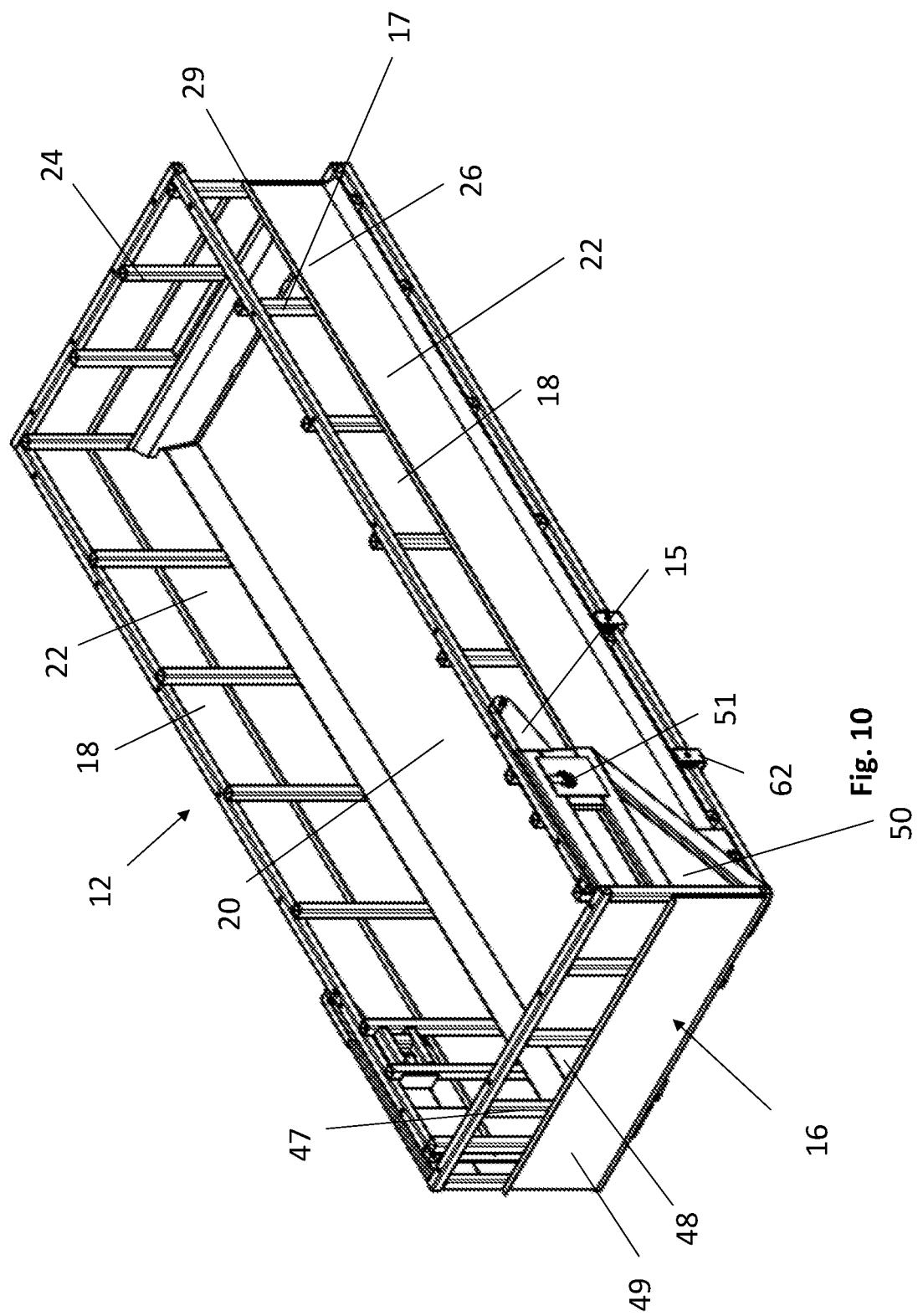
FIG. 10 is a perspective view from the rear of a main body and a lift gate of a container assembly according to the invention.
Figure 11:
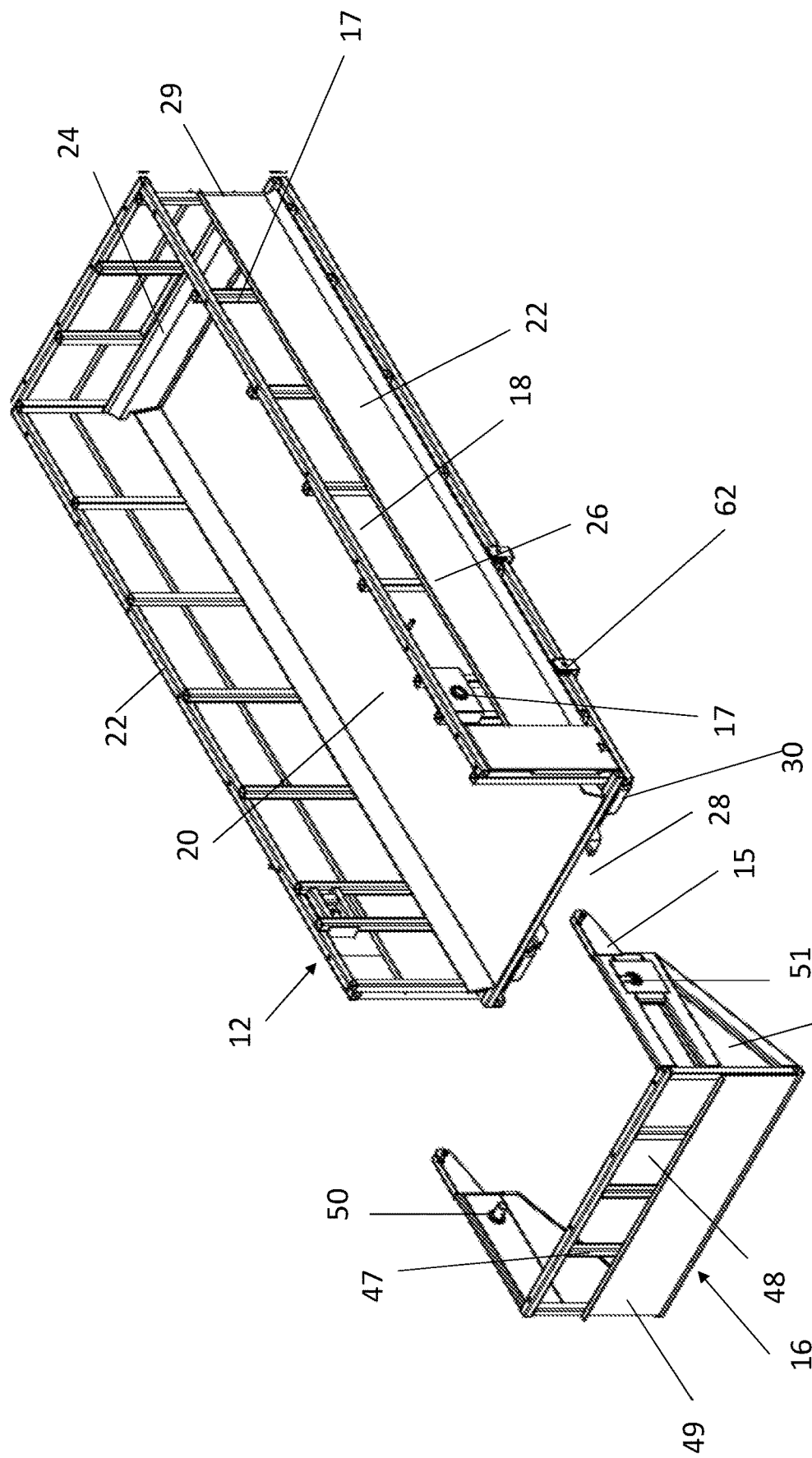
FIG. 11 is a partially expanded perspective view from the rear of a main body and a lift gate of a container assembly according to the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention.

Hence, specific dimensions and other physical characteristics related to the embodiments disclosed herein are not to be considered as limiting.

The present invention is directed to a container assembly 10 with a main body 12 and a liner 14 adapted to fit inside the main body 12 (FIGS. 1-9). The container assembly 10 may also include a lift gate 16 which is adapted to automatically open and close during use, such that an operator does not have to manually open the lift gate 16 (FIGS. 1-9).

As shown in FIGS. 1-11, the main body 12 has a frame with a plurality of frame members defining a plurality of openings 18. The frame members may be made from metal tubing, for example, A572 Grade 50 steel tubing. The openings 18 allow airflow through the main body 12 to allow for more rapid cooling of the material that is placed in the container assembly 10. The main body 12 includes a floor 20, two side walls 22 and an end wall 24. The main body 12 can include panels 26 that cover all or a portion of the openings 18. The floor 20 may be solid and not include any openings. The floor 20 and the panels 26 may be made of steel or other sheet metal, equivalent to A572 Grade 50 sheet metal or higher.

The main body 12 has an open end 28 to allow for dumping of material from the container assembly 10. Attached to the open end 28 of the main body 12 is a lift gate 16. The lift gate 16 is adapted to transition from a first open position in which the open end 28 of the main body 12 is covered to maintain the contents of the container assembly 10 within the container assembly 10 to a second open position in which the open end 28 of the main body 12 is open to allow the contents of the container assembly 10 to be dumped from the container assembly 10.

The main body 12 further comprises a plurality of rollers 30 located on the underside of the floor 20, corresponding to the corners of the main body 12 which function to support the container assembly 10 when the container assembly 10 is placed on the ground. Further, a plurality of nose rollers 32 may be located between two rails 34 on an underside of the floor 20 of the main body 12 to assist in loading the container assembly 10 onto a transportation vehicle, for example, a specially adapted truck. The rails 34 extend parallel to the side walls 22 and perpendicular to the end wall 24. The main body 12 may also have a container hook to allow for hoisting during loading or unloading of the container assembly 10.

Figure 12:
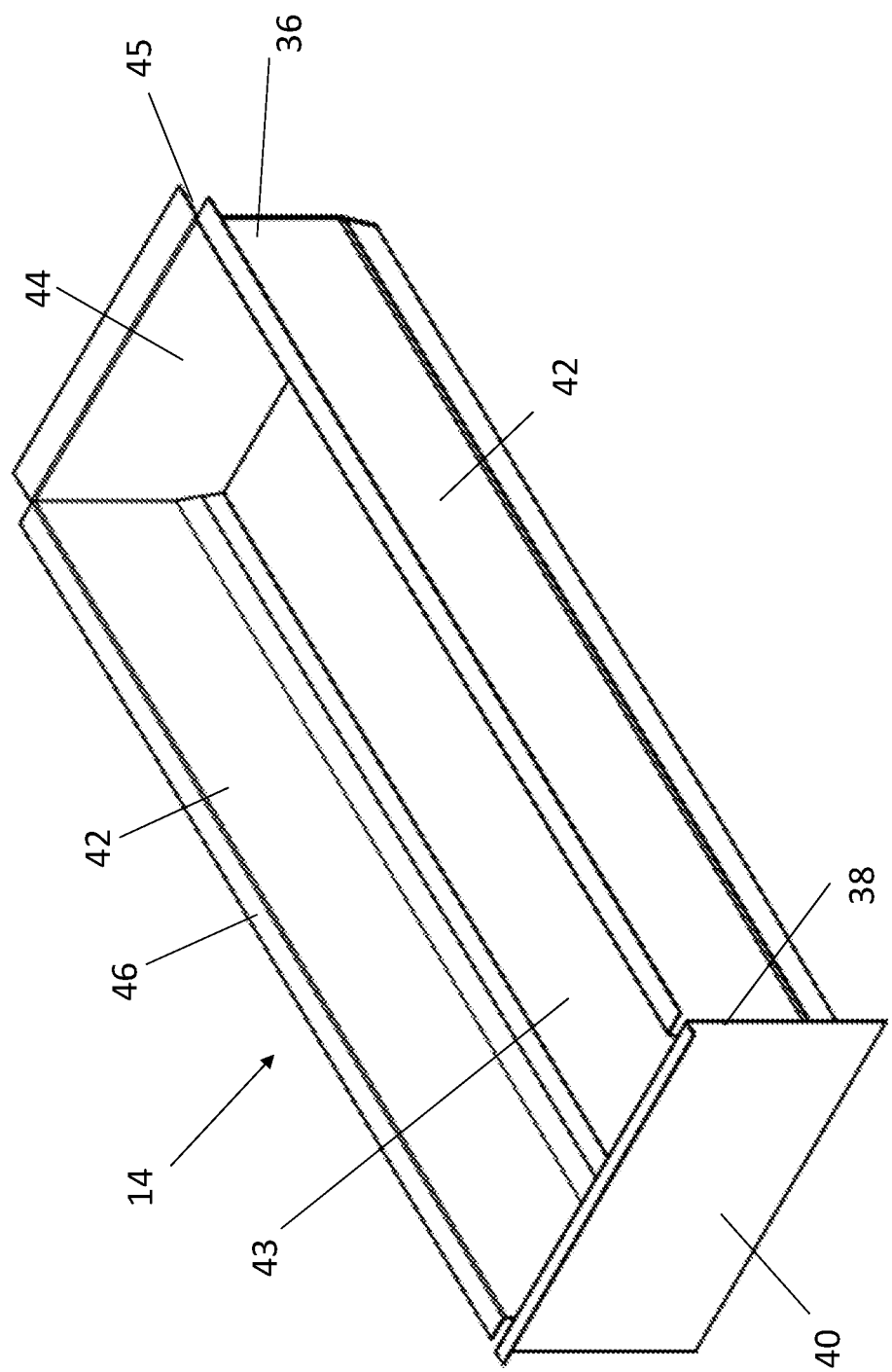
FIG. 12 is a perspective view from the rear of a liner of a container assembly according to the invention.
Figure 13:
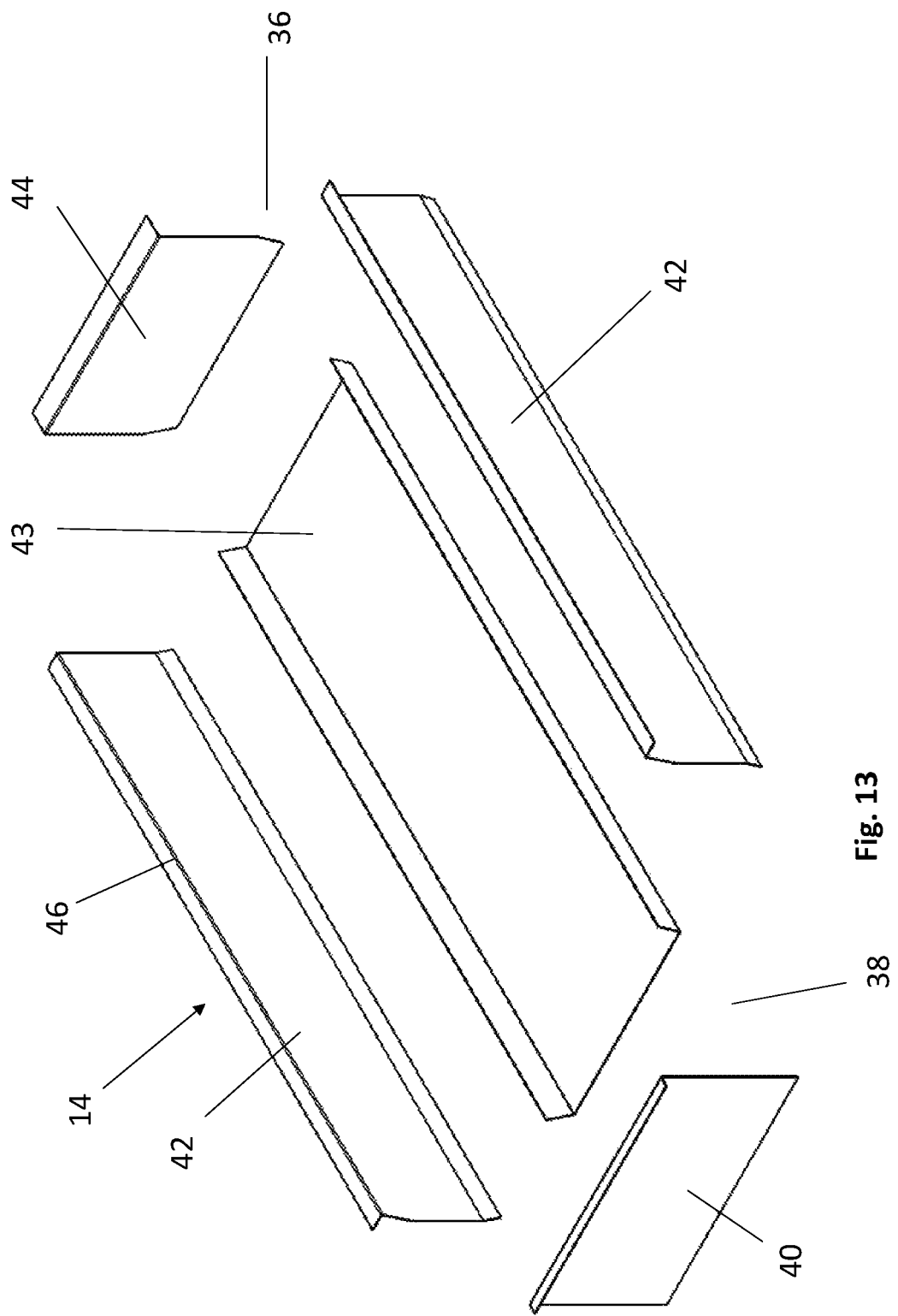
FIG. 13 is an expanded perspective view from the rear of a liner of a container assembly according to the invention.
Figure 14:
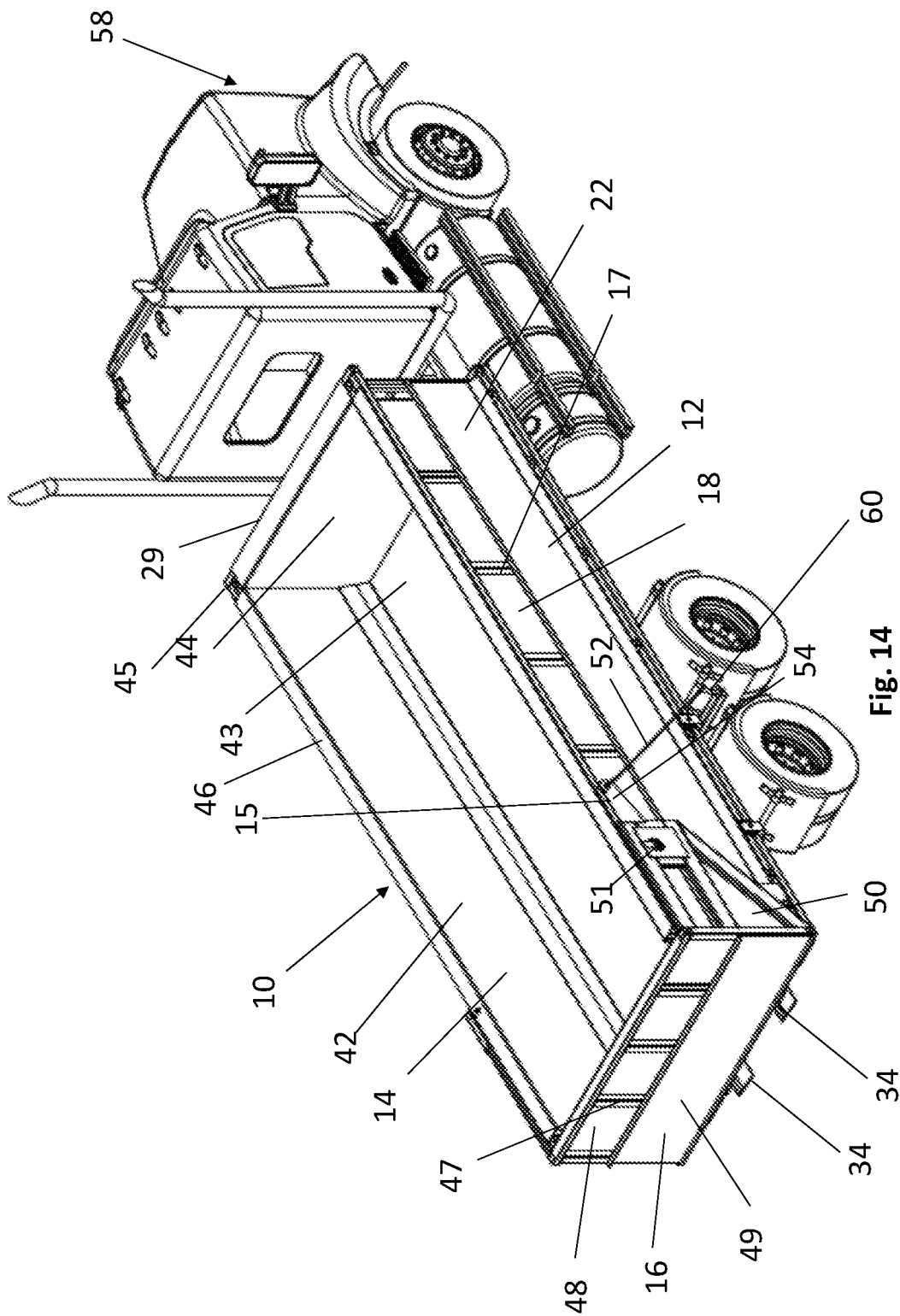
FIG. 14 is a perspective view from the rear of a container assembly on a transportation vehicle, comprising a main body, a lift gate, a link, and a liner according to the invention.
Figure 15:
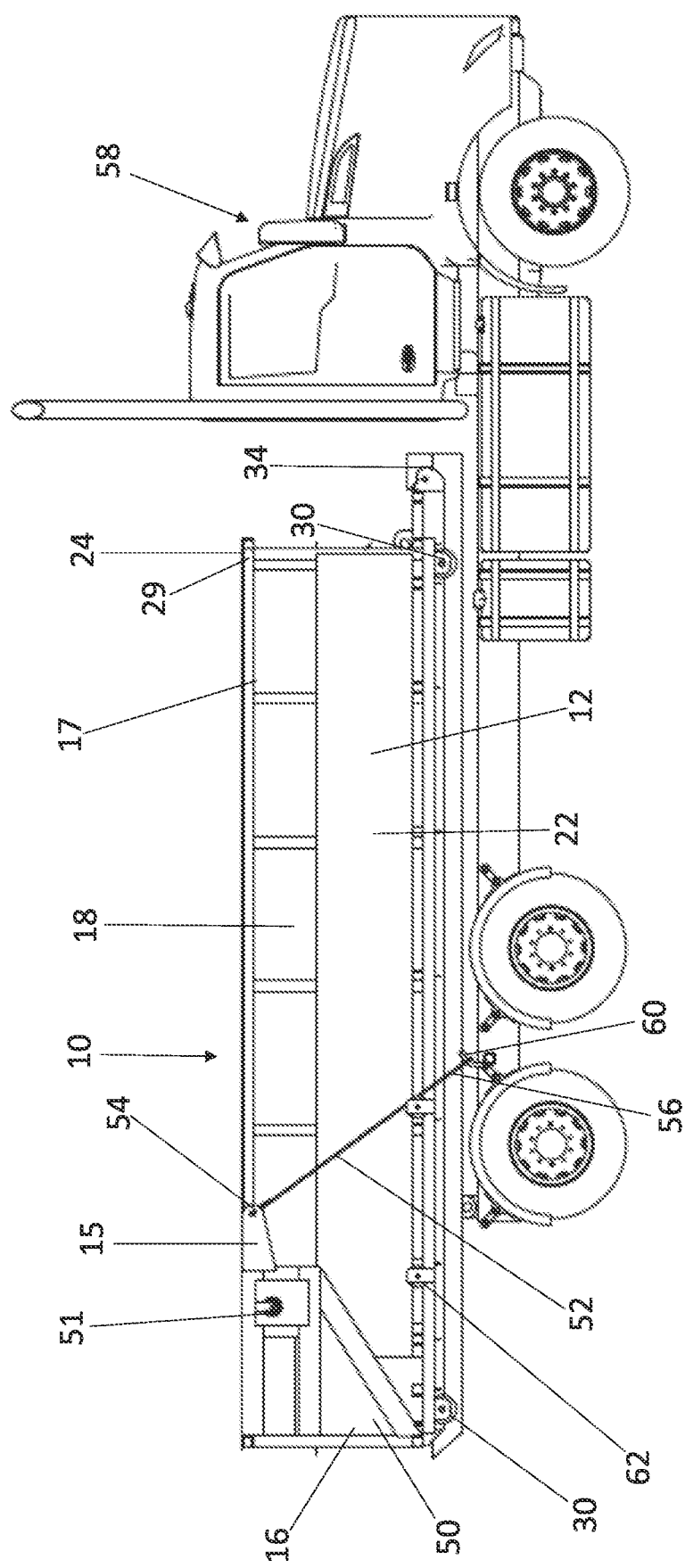
FIG. 15 is a side view of a container assembly on a transportation vehicle, comprising a main body, a lift gate, a link, and a liner, with the lift gate in the closed position according to the invention.
Figure 16:
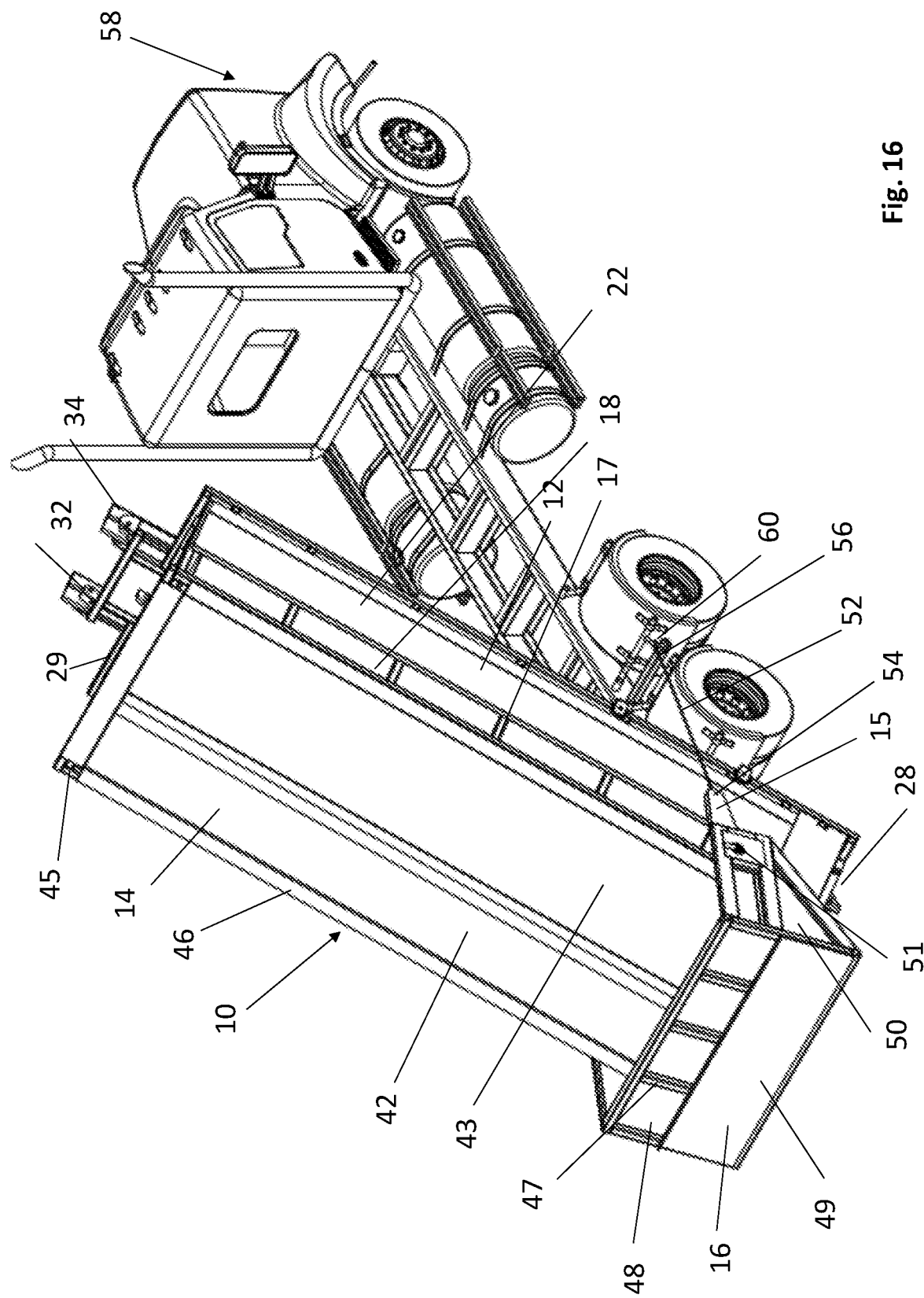
FIG. 16 is a perspective view from the rear of a container assembly on a transportation vehicle, comprising a main body, a lift gate, a link, and a liner, with the lift gate in the open position and the container assembly elevated according to the invention.
Figure 17:
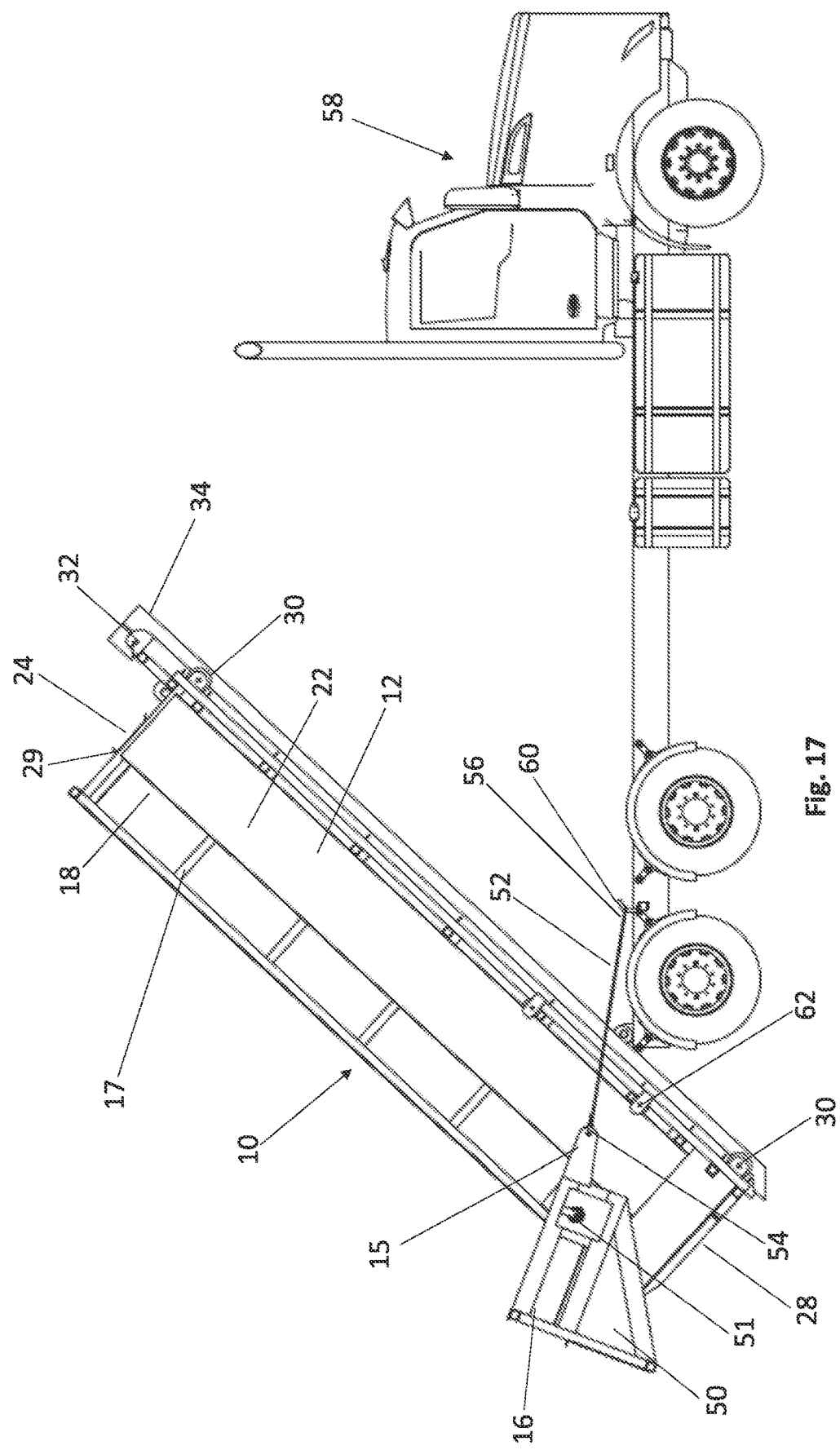
FIG. 17 is a side view of a container assembly on a transportation vehicle, comprising a main body, a lift gate, a link, and a liner, with the lift gate in the open position and the container assembly elevated according to the invention.
Figure 18:
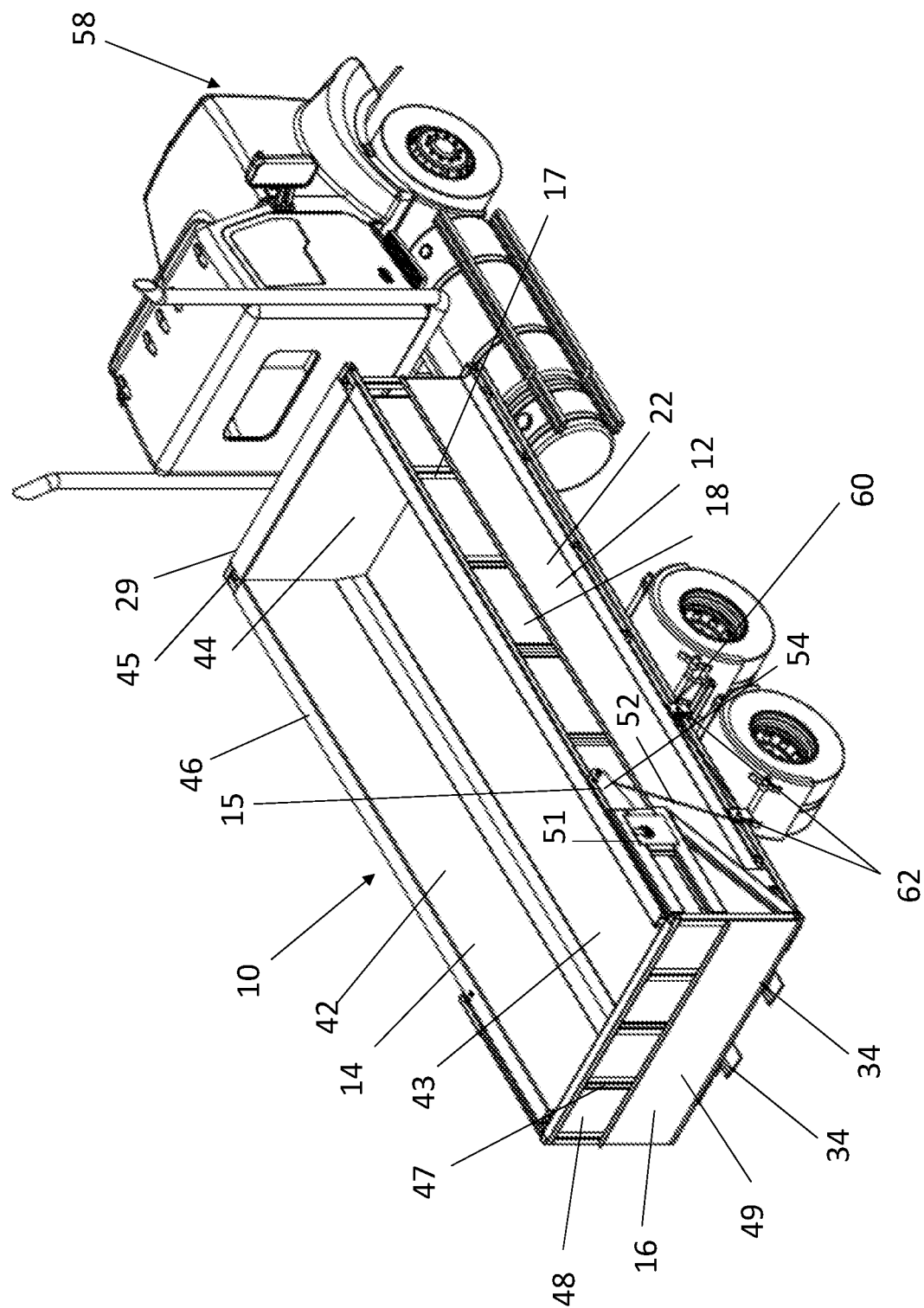
FIG. 18 is a perspective view from the rear of a container assembly comprising a main body, a lift gate, a link configured in a pulley arrangement, and a liner on a transportation vehicle according to the invention.
Figure 19:
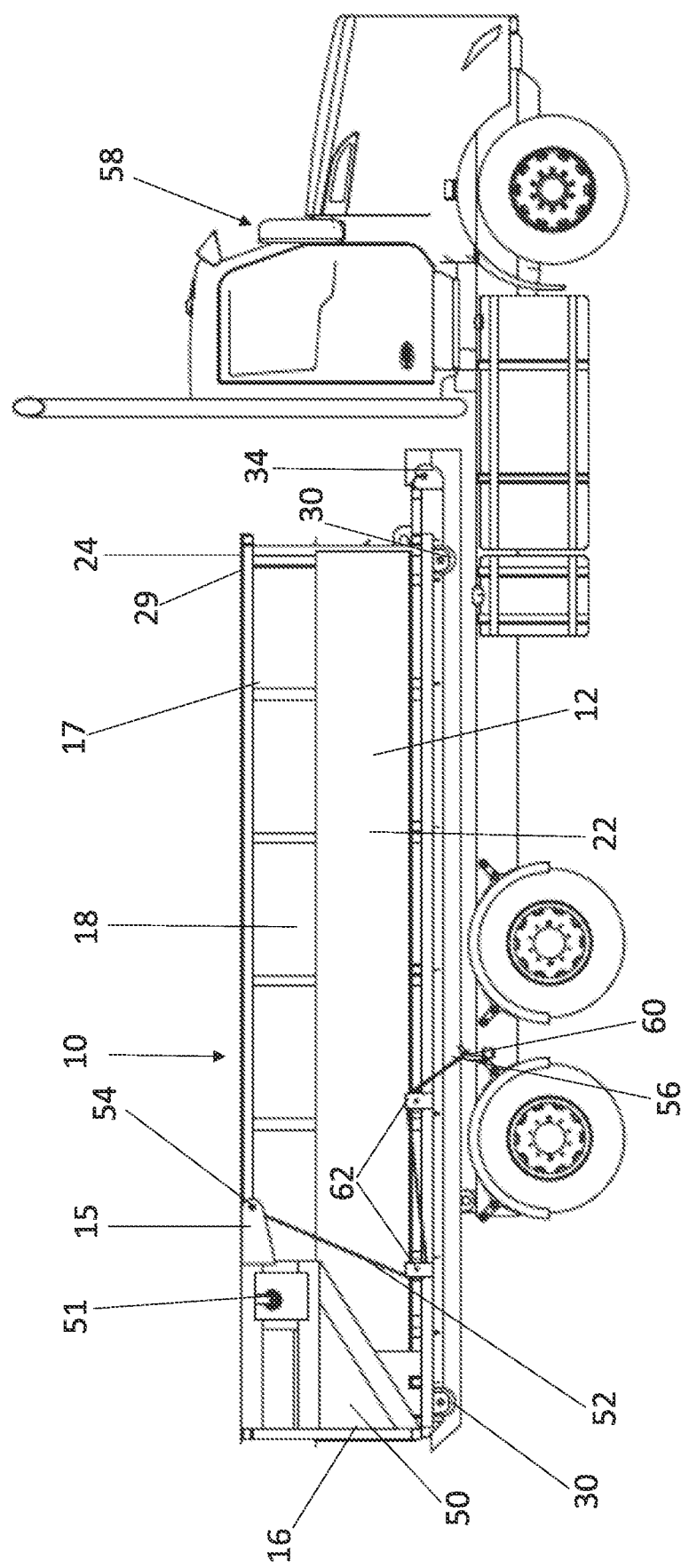
FIG. 19 is a side view of a container assembly on a transportation vehicle, comprising a main body, a lift gate, a link configured in a pulley arrangement, and a liner, with the lift gate in the closed position according to the invention.
Figure 20:
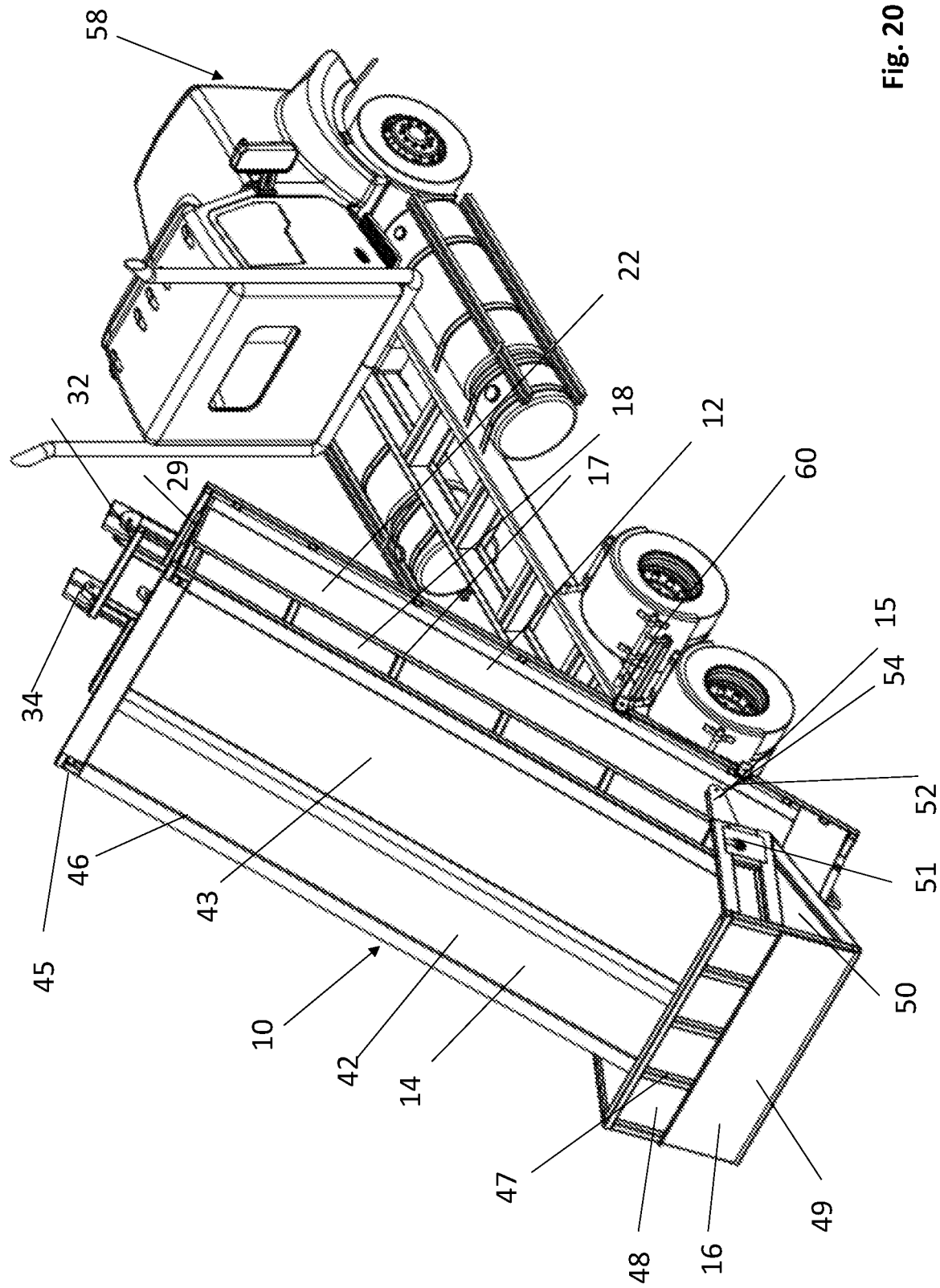
FIG. 20 is a perspective view from the rear of a container assembly on a transportation vehicle, comprising a main body, a lift gate, a link configured in a pulley arrangement, and a liner, with the lift gate in the open position and the container assembly elevated according to the invention.
Figure 21:
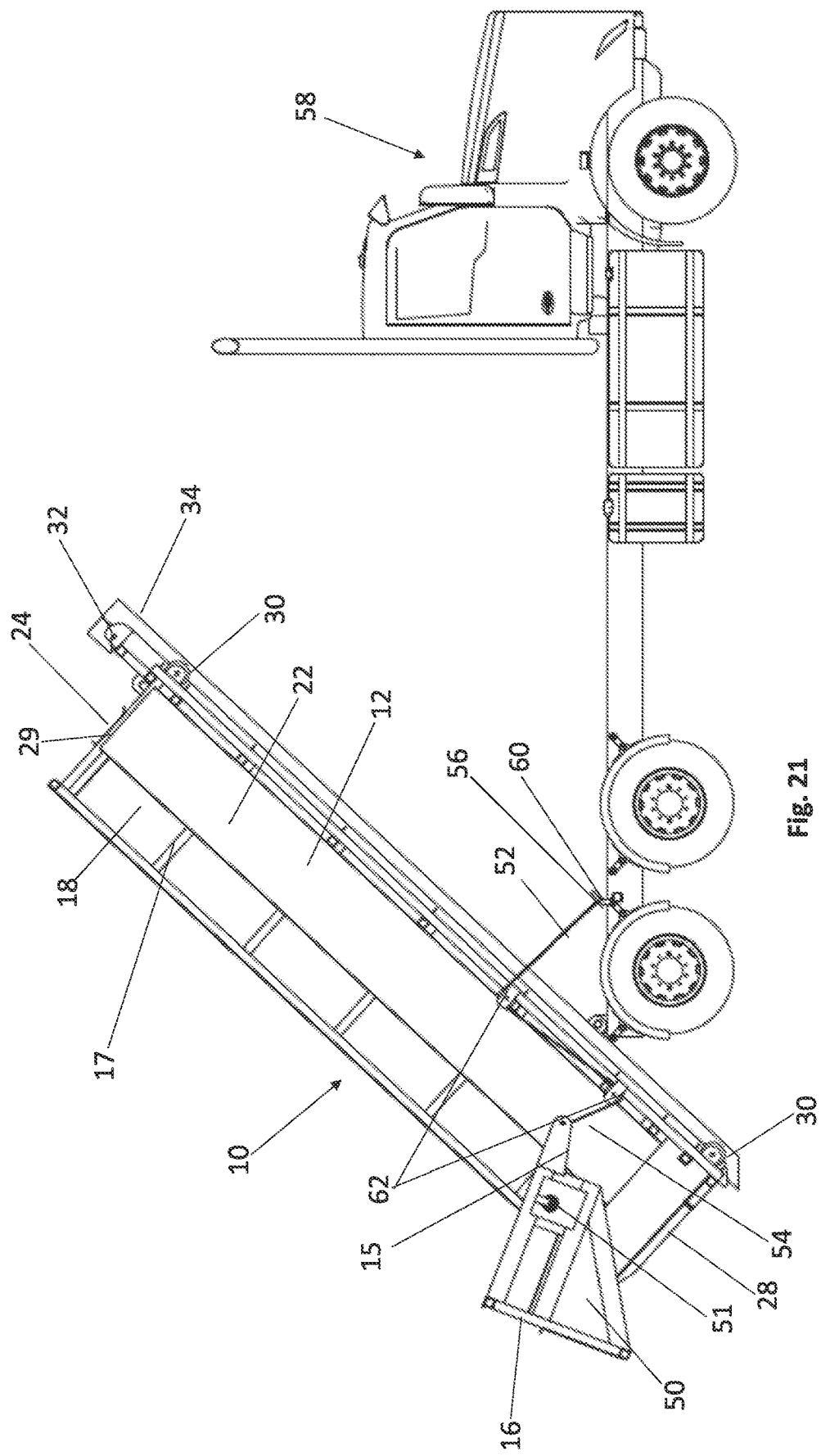
FIG. 21 is a side view of a container assembly on a transportation vehicle, comprising a main body, a lift gate, a link configured in a pulley arrangement, and a liner, with the lift gate in the open position and the container assembly elevated according to the invention.

As shown in FIGS. 1-9, 12, and 13, the liner 14 has a closed first end 36 and an open second end 38 and is configured to have a shape corresponding to the shape of the main body 12. The liner 14 comprises a gate liner panel 40, two sides 42, an end panel 44, and a floor panel 43 (FIGS. 12 and 13). Each of the two sides 42, end panel 44, and floor panel 43 may be a single piece, or may be one or more pieces connected together. The end panel 44 is attached to the sides 42, such that the first end 36 of the liner 14 is closed. The sides 42 and bottom of the liner 14 may be formed from two side panels that are bent to form the sides 42 of the liner 14 and attach to one another to form the floor panel 43 of the liner 14. Alternatively, the sides 42 of the liner 14 may be two separate panels that are attached to an additionally provided floor panel 43. A second end piece, the gate liner panel 40, which is separate from the sides 42, is provided at the second end 38 of the liner 14. The gate liner panel 40 is attached to the lift gate 16. In this way, the gate liner panel 40 is transitionable from a first position in which the gate liner panel 40 closes the second end 38 of the liner 14 to maintain the contents of the container assembly 10 within the liner 14 to a second position where the second end 38 of the liner 14 is open to allow the contents of the container assembly 10 to be dumped from the container assembly 10.

The components of the liner 14 may be permanently affixed together, for example, by welding.

The main body 12 has features adapted to accept and hold the liner 14 in place. The liner 14 is supported by the floor 20 of the main body 12 and is adapted to be removably affixed to the main body 12. Particularly, the liner 14 sits in the main body 12 wherein the floor panel 43 of the liner 14 is supported by the floor 20 of the main body 12 with no rigid connections, allowing the liner 14 to move independently with respect to the main body 12. The floor 20 of the main body 12 and the floor 43 of the liner 14 have substantially the same shape, but differ in size such that a gap 45 exists between the perimeter defined by the side walls 22 and the end wall 24 of the main body 12 and the perimeter defined by the sides 42 and the end panel 44 of the liner 14. The gap 45 is provided to allow the liner 14 to expand when hot materials are placed in the container assembly 10. The gap 45 may be sized such that the distance between the outer perimeter of the liner 14 and the inner perimeter of the main body 12 is at least 2 inches or at least 1 inch. The distance between the end wall 24 of the main body 12 and the end panel 44 of the liner 14 may be greater than the distance between the side walls 22 of the main body 12 and the sides 42 of the liner 14.

The liner 14 may include a flange 46 that extends from the sides 42 and/or the end panel 44 of the liner 14 at the uppermost perimeter of the liner 14. The flange 46 may be connected to the main body 12 by at least one connecting member, such as a pin, that secures the uppermost portion of the sides 42 of the liner 14 and the end panel 44 of the liner 14 to the uppermost portion of the side walls 22 of the main body 12 and the end wall 24 of the main body 12, respectively. For example, the flange 46 may be connected to the uppermost frame member of the main body 12. The attachment of the liner 14 to the main body 12 may include permanent connections, where the liner 14 is rigidly attached to the main body 12, and movable connections, where the liner 14 can move with respect to the main body 12. The movable connections may include elongated slots in the liner 14 through which the connecting member attached to the main body 12 extends thereby allowing the liner 14 to move with respect to the main body 12 when the liner 14 expands when hot materials are placed in the container assembly 10.

The liner 14 may be formed from a material which has resistance to extreme high and low temperatures, flames, chemical erosion, corrosion, and heavy impact. For example, the liner 14 may be made of hardened steel, such as HardOX Hitemp, or any equivalent steel with high wear and abrasion resistance and hardness, such as AR400. When the liner 14 is adapted specifically for the containment of slag, the liner 14 may be made with a material designed to retain strength and hardness at elevated temperatures between 550° F. to 950° F. and to withstand the impact of the falling hot slag being loaded into the container assembly 10. Such a liner 14 helps to avoid premature wear and subsequent failure of the container assembly 10, which can be dangerous to operators.

The liner 14 may be selectively removed from the main body 12. A new, unworn liner 14 can then be placed into the same main body 12 to allow for reuse of the main body 12.

As shown in FIGS. 1-13, the lift gate 16 is made from steel or other hard metal construction similar to that of the main body 12. The lift gate 16 may be comprised of a plurality of frame members 47 defining a plurality of openings 48, similar to the main body 12. The lift gate 16 includes an end panel 49 and two side panels 50 extending from either side of the end panel 49. The side panels 50 are pivotably attached to the main body 12 and may be attached to the main body 12 by pins 51. The pins 51 may extend through the lift gate 16 into a corresponding hole in the main body 12. The lift gate 16 may also include an extension arm 15, for example, a clevis pin, extending from at least one of the side panels 50 of the lift gate 16 adjacent the pivot point.

As shown in FIGS. 14-21, the lift gate 16 is further adapted to automatically open or close upon movement of the entire container assembly 10. The lift gate 16 may have a link 52 on each side, the link 52 having a first end 54 and a second end 56. The link 52 may be comprised of a rope sling or steel cable, or other such material capable of withstanding tension. The link 52 is adapted so that the first end 54 may be attached to the lift gate 16 and the metal eye or loop of the second end 56 may be attached to a vehicle 58 used to transport the collection assembly 10, for example, a flatbed truck. The link 52 may be attached to the extension arm 15 of the lift gate 16 and an engagement member 60, such as a hook, on the vehicle 58 by a metal eye or loop provided at each of the first end 54 and second end 56. The metal eye or loop of the first end 54 of the link 52 may be permanently or removably secured to the extension arm 15, and the second end 56 of the link 52 may be removably secured to an engagement member 60 that is permanently attached to the vehicle 58. Through this connection, the link 52 connects the extension arm 15 to the engagement member 60. The link 52 may alternatively be threaded between two pulleys 62 also affixed to the main body 12 of the container assembly 10.

As shown in FIGS. 14, 15, 18, and 19, when the second end 56 of the link 52 is engaged with the engagement member 60 on the vehicle 58 and the container assembly 10 is in a lowered position on the vehicle such that the floor 20 of the main body 10 is substantially parallel to the ground, i.e., the container assembly 10 is in a horizontal position, the lift gate 16 is locked in a closed position with the end panel 49 of the lift gate 16 substantially perpendicular to the ground and covering the open end 28 of the main body 12 and the open end 38 of the liner 14. As shown in FIGS. 16, 17, 20, and 21, when the container assembly 10 is put into an elevated position by raising the closed end of the main body 12 in a upward direction, the link 52 provides tension against the extension arm 15 to apply a cantilever action on the extension arms 15 and pivots the lift gate 16 upon the axis of the pins 51 to allow the lift gate 16 to maintain the same position with the end panel 49 of the lift gate 16 substantially perpendicular to ground, while the main body 12, including the liner 14, of the container assembly 10 is elevated into a partially upright position in which the floor 20 of the main body 12 is angled with respect to the ground effectively opening the lift gate 16 and allowing the contents of the container assembly 10 to be dumped from the container assembly 10.

The automatic opening and closing of the lift gate 16 as described above allows for an individual to operate the container assembly 10 without having to manually open and close the lift gate 16. This eliminates the need to expose an operator to unnecessary danger resulting from the extremely high temperatures of the material which may be within the container assembly 10. This also speeds up the process of offloading dangerous material, thereby improving efficiency of dumping hazardous material.

Various preferred and non-limiting embodiments or aspects of the present invention will now be described and set forth in the following numbered clauses:

Clause 1: A container for transporting material comprising: a main body having a perimeter defining an interior space; a liner disposed within the interior space of the main body, the liner having a perimeter with a shape corresponding to a shape of the perimeter of the main body and defining an interior space, wherein a gap is provided between the perimeter of the main body and the perimeter of the liner.

Clause 2: The container of clause 1, wherein the main body is comprised of a plurality of frame members that define a plurality of open spaces.

Clause 3: The container of clause 1 or 2, wherein the liner is movably connected to the main body.

Clause 4: The container of any one of clauses 1-3, wherein the liner is movably connected to the main body by at least one connector attached to the main body or the liner that extends through at least one elongated slot in the other of the main body or the liner.

Clause 5: The container of any one of clauses 1-4, wherein a lift gate is pivotably attached to the main body.

Clause 6: A container for transporting material comprising: a main body comprising a perimeter comprising two sides, a closed end, and an open end and defining an interior space; a lift gate pivotably attached at the open end of the main body; and a link having a first end connected to the lift gate and a second end adapted to be connected to a vehicle used to transport the container, wherein when the container is placed on the vehicle and the closed end of the main body is raised with respect to the open end of the main body, the engagement of the link with the lift gate and the vehicle automatically transitions the lift gate from a first position in which the open end of the main body is covered by the lift gate to contain material within the interior space to a second position in which the open end of the main body is not covered by the lift gate to allow material to be emptied from the interior space.

Clause 7: The container of clause 6, wherein the link is a flexible attachment member comprised of a cable.

Clause 8: The container of clause 7, wherein the cable is threaded through a plurality of pulleys between the first end and the second end to facilitate transitioning of the lift gate.

Clause 9: The container of any one of clauses 6-8, wherein the main body has a perimeter defining an interior space and the container further comprises a liner disposed within the interior space defined by the perimeter of the main body, and wherein the liner has a perimeter with a shape corresponding to a shape of the perimeter of the main body and defining an interior space.

Clause 10: The container of clause 9, wherein a gap is provided between the perimeter of the main body and the perimeter of the liner.

Clause 11: The container of clause 9 or 10, wherein the liner is movable with respect to the main body through a movable connection between the liner and the main body.

Clause 12: The container of any one of clauses 6-10, wherein the main body is comprised of a plurality of frame members that define a plurality of open spaces.

Clause 13: An assembly for transporting material comprising: a vehicle including an engagement member; a container adapted to be carried by the vehicle, the container comprising a main body comprising a perimeter comprising two sides, a closed end, and an open end and defining an interior space; a lift gate pivotably attached at the open end of the main body of the container; and a link having a first end connected to the lift gate and a second end connected to the engagement member, wherein when the container is placed on the vehicle and the closed end of the main body is raised with respect to the open end of the main body, the engagement of the link with the lift gate and the vehicle automatically transitions the lift gate from a first position in which the open end of the main body is covered by the lift gate to contain material within the interior space of the container to a second position in which the open end of the main body is not covered by the lift gate to allow material to be emptied from the interior space of the container.

Clause 14: The assembly of clause 13, wherein the link is a flexible attachment member comprised of a cable.

Clause 15: The assembly of clause 14, wherein the cable is threaded through a plurality of pulleys between the first end and the second end to facilitate transitioning of the lift.

Clause 16: The assembly of any one of clauses 13-15, wherein the main body has a perimeter defining an interior space and the container further comprises a liner disposed within the interior space defined by the perimeter of the main body, and wherein the liner has a perimeter with a shape corresponding to a shape of the perimeter of the main body and defining an interior space.

Clause 17: The assembly of clause 16, wherein a gap is provided between the perimeter of the main body and the perimeter of the liner.

Clause 18: The assembly of clause 16 or 17, wherein the liner is movable with respect to the main body through a movable connection between the liner and the main body.

Clause 19: The assembly of any one of clauses 13-18, wherein the main body is comprised of a plurality of frame members that define a plurality of open spaces.

The invention claimed is:

1. A container for transporting material comprising:
   a main body comprising a floor, two sidewalls, and an end wall, wherein the sidewalls and the end wall define a perimeter that at least partially defines an interior space; and
   a liner disposed within the interior space of the main body, the liner comprising a floor, two sides, and an end panel, wherein the sides and the end panel define a perimeter with a shape corresponding to a shape of the perimeter of the main body and at least partially define an interior space,
   wherein the floor of the main body and the floor of the liner have substantially the same shape, but differ in size such that a gap is provided at least between the two sidewalls of the main body and the two sides of the liner, and
   an uppermost perimeter of the liner is movably connected to an uppermost perimeter of the main body to allow the two sides and the bottom of the liner to thermally expand into the gap.

2. The container of claim 1, wherein the main body is comprised of a plurality of frame members that define a plurality of open spaces.

3. The container of claim 1, wherein the liner is movably connected to the main body by at least one pin attached to the main body or the liner that extends through at least one elongated slot in the other of the main body or the liner.

4. The container of claim 1, wherein a lift gate is pivotably attached to the main body.

5. The container of claim 1, further comprising:
   a lift gate pivotably attached at an open end of the main body; and
   a link having a first end connected to the lift gate and a second end adapted to be connected to a vehicle used to transport the container,
   wherein when the container is placed on the vehicle and a closed end of the main body is raised with respect to the open end of the main body, the engagement of the link with the lift gate and the vehicle automatically transitions the lift gate from a first position in which the open end of the main body is covered by the lift gate to contain material within the interior space to a second position in which the open end of the main body is not covered by the lift gate to allow material to be emptied from the interior space.

6. The container of claim 5, wherein the link is a flexible attachment member comprised of a cable.

7. The container of claim 6, wherein the cable is threaded through a plurality of pulleys between the first end and the second end to facilitate transitioning of the lift gate.

8. The container of claim 1, wherein a flange extends from the sides and the end panel of the liner at an uppermost perimeter of the liner and the flange is movably connected to an upper surface of the sidewalls and end wall of the main body.

9. The container of claim 1, further comprising a plurality of rollers located on the underside of the floor of the main body.

10. The container of claim 1, further comprising a plurality of nose rollers located between two rails on an underside of the floor of the main body to assist in loading the container onto a transportation vehicle.

11. An assembly for transporting material comprising:
    the container of claim 5; and
    a vehicle including an engagement member that connects to the second end of the link.

12. The assembly of claim 11, wherein the link is a flexible attachment member comprised of a cable.

13. The assembly of claim 12, wherein the cable is threaded through a plurality of pulleys between the first end and the second end to facilitate transitioning of the lift gate.

14. The assembly of claim 11, wherein the container is removable from the vehicle.

* * * * *